United States Patent [19]
Komine et al.

[11] Patent Number: 5,260,777
[45] Date of Patent: Nov. 9, 1993

[54] APPARATUS FOR REPRODUCING VISIBLE COLOR IMAGE FROM COLOR SEPARATIONS

[75] Inventors: Takayuki Komine, Kawasaki; Masanori Sakai; Tetsuya Ohnishi, both of Yokohama; Toshihiro Kadowaki; Toshio Honma, both of Kawasaki, all of Japan

[73] Assignee: Canon Kabushiki Kaisha, Tokyo, Japan

[21] Appl. No.: 892,733

[22] Filed: Jun. 1, 1992

Related U.S. Application Data

[63] Continuation of Ser. No. 436,769, Nov. 15, 1989, abandoned.

[30] Foreign Application Priority Data

Nov. 15, 1988 [JP] Japan .................. 63-289108

[51] Int. Cl.⁵ ................................. H04N 1/46
[52] U.S. Cl. ..................... 358/500; 358/527
[58] Field of Search ............... 358/75, 78, 80

[56] References Cited

U.S. PATENT DOCUMENTS

| | | | |
|---|---|---|---|
| 3,583,804 | 6/1971 | Mueller | 358/331 X |
| 3,586,434 | 6/1971 | Mueller | 358/333 X |
| 3,664,248 | 5/1972 | Mueller | 358/331 X |
| 4,718,040 | 1/1988 | Ayata et al. | 358/75 X |
| 4,745,467 | 5/1988 | Sekizawa et al. | 358/75 X |
| 4,905,079 | 2/1990 | Hayashi | 358/75 X |
| 4,954,887 | 9/1990 | Ono | 358/75 |

FOREIGN PATENT DOCUMENTS

| | | |
|---|---|---|
| 0070677 | 1/1983 | European Pat. Off. |
| 0217503 | 4/1987 | European Pat. Off. |
| 0249690 | 12/1987 | European Pat. Off. |
| 2077548 | 12/1981 | United Kingdom |
| 2139451 | 11/1984 | United Kingdom |

*Primary Examiner*—Kenneth A. Wieder
*Assistant Examiner*—Glenn W. Brown
*Attorney, Agent, or Firm*—Fitzpatrick, Cella, Harper & Scinto

[57] ABSTRACT

An image processing apparatus is provided for reading color separations, each separation corresponding to each of plural color components. A memory stores each of the signals attained by reading the color separations. The signals stored in the memory are read and are reproduced by combining the color separations as visible images.

15 Claims, 32 Drawing Sheets

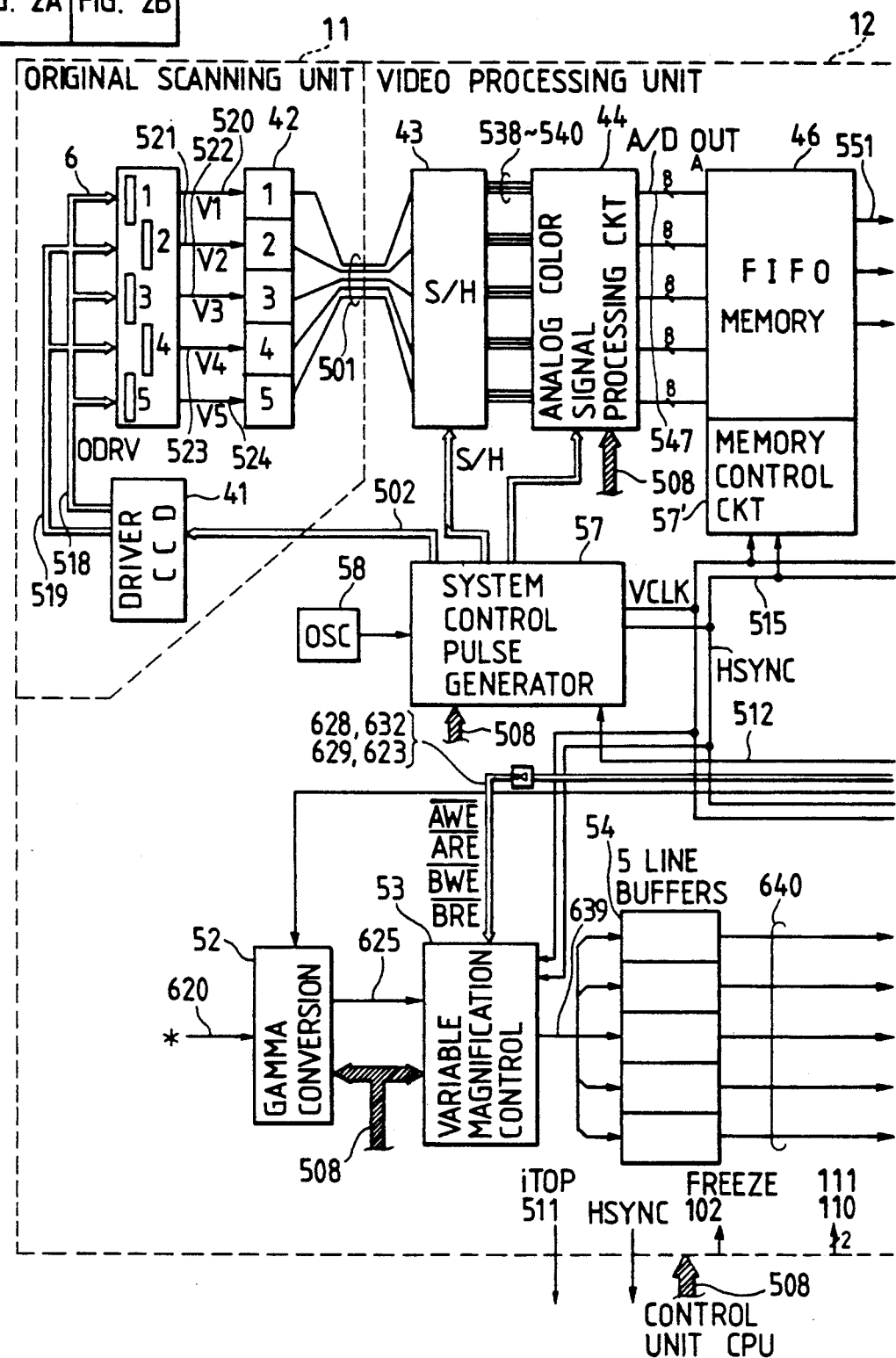

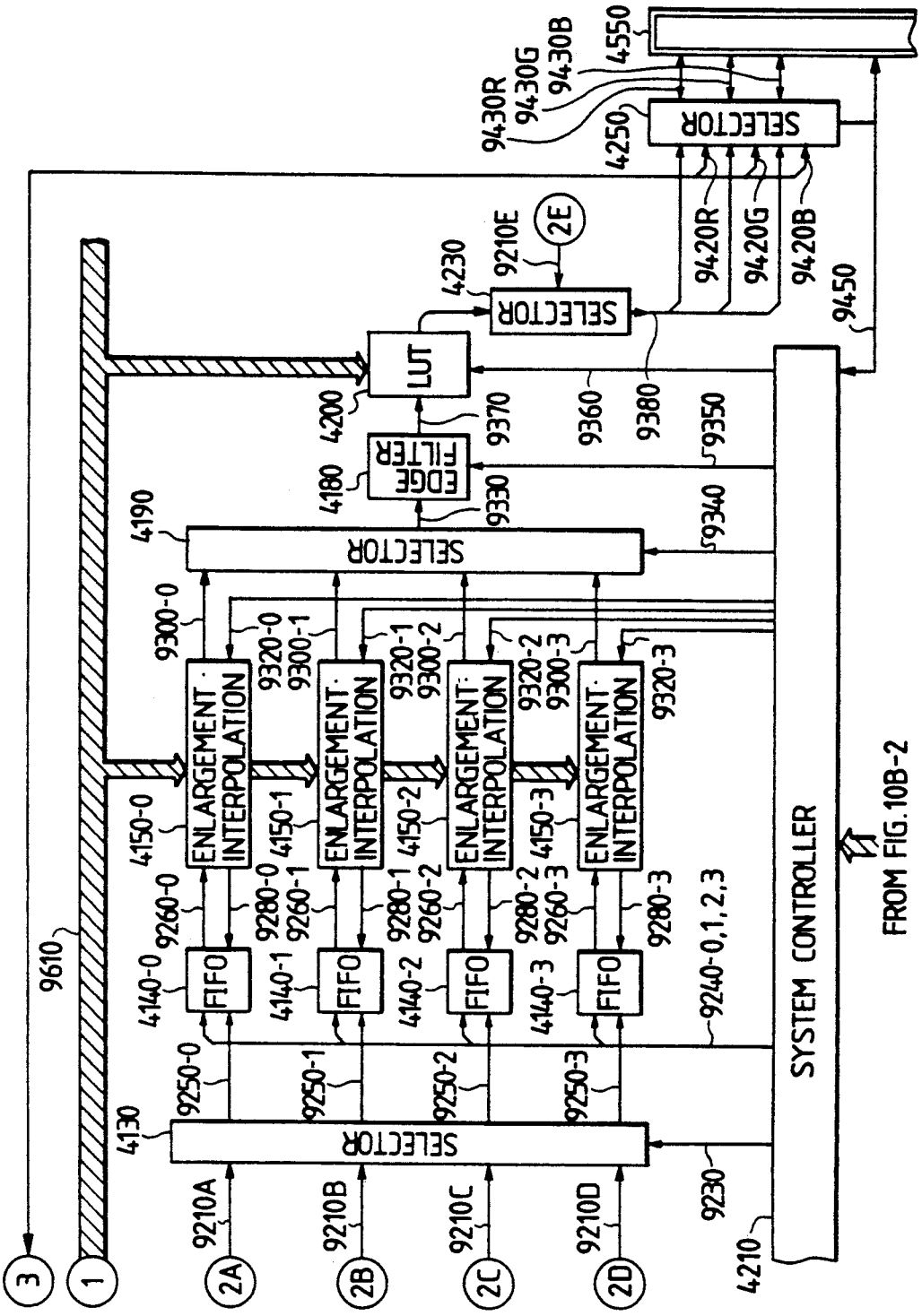

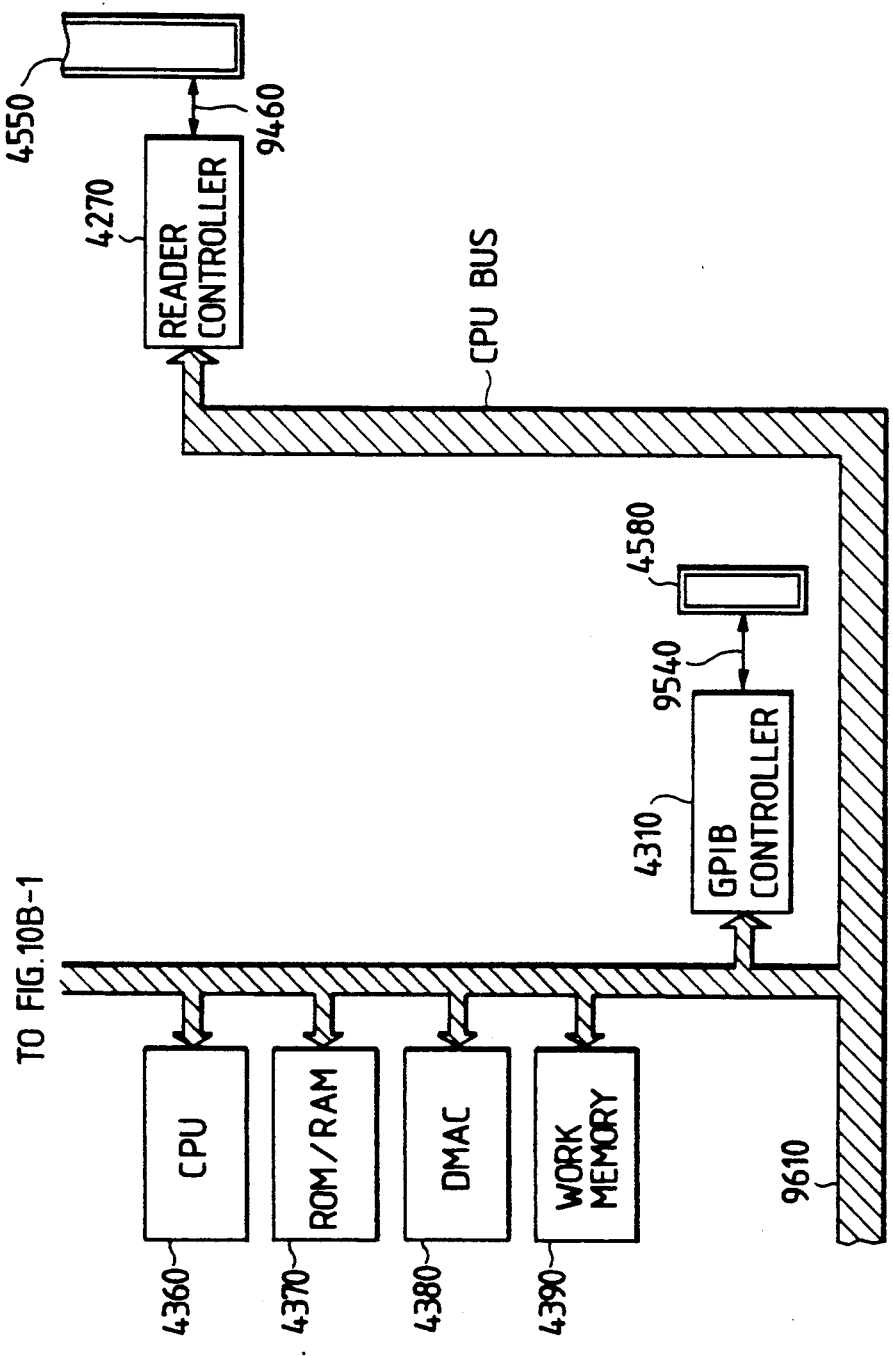

FIG. 16

| | MEMORY(R) 4060R | MEMORY(G) 4060G | MEMORY(B) 4060B |
|---|---|---|---|
| 2M | IMAGE 15 | IMAGE 15 | IMAGE 15 |
| 1.875M | IMAGE 14 | IMAGE 14 | IMAGE 14 |
| 1.75M | IMAGE 13 | IMAGE 13 | IMAGE 13 |
| 1.625M | IMAGE 12 | IMAGE 12 | IMAGE 12 |
| 1.5M | IMAGE 11 | IMAGE 11 | IMAGE 11 |
| 1.375M | IMAGE 10 | IMAGE 10 | IMAGE 10 |
| 1.25M | IMAGE 9 | IMAGE 9 | IMAGE 9 |
| 1.125M | IMAGE 8 | IMAGE 8 | IMAGE 8 |
| 1M | IMAGE 7 | IMAGE 7 | IMAGE 7 |
| 0.875M | IMAGE 6 | IMAGE 6 | IMAGE 6 |
| 0.75M | IMAGE 5 | IMAGE 5 | IMAGE 5 |
| 0.625M | IMAGE 4 | IMAGE 4 | IMAGE 4 |
| 0.5M | IMAGE 3 | IMAGE 3 | IMAGE 3 |
| 0.375M | IMAGE 2 | IMAGE 2 | IMAGE 2 |
| 0.25M | IMAGE 1 | IMAGE 1 | IMAGE 1 |
| 0.125M | IMAGE 0 | IMAGE 0 | IMAGE 0 |
| 0 | | | |

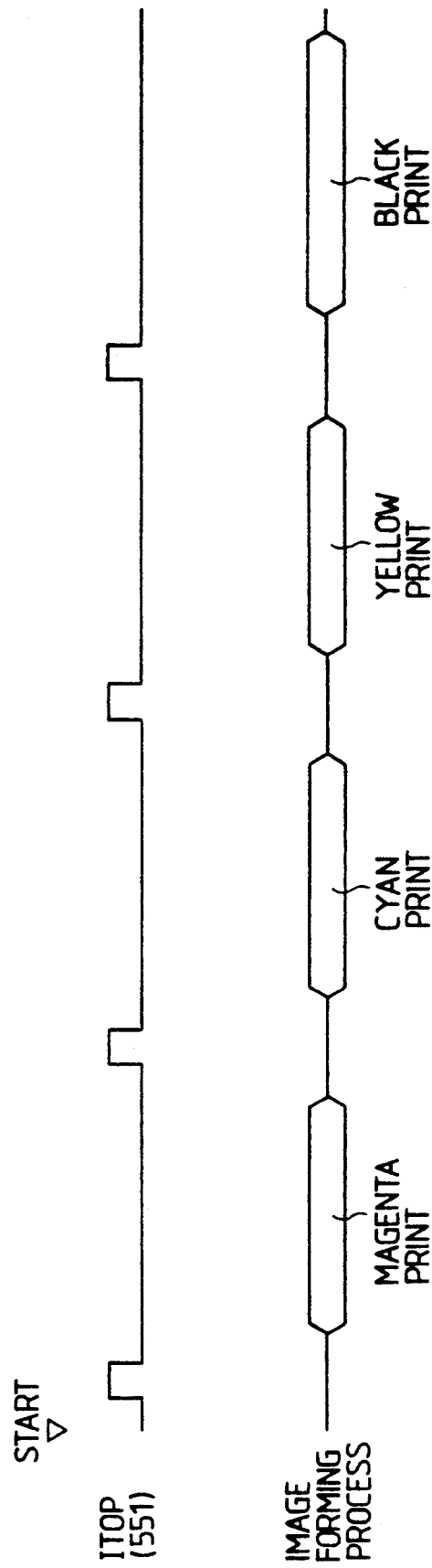

| MEMORY A (R) | MEMORY A (G) | MEMORY A (B) |
|---|---|---|
| IMAGE R 1/16 | IMAGE G 1/16 | IMAGE B 1/16 |
| IMAGE R 2/16 | IMAGE G 2/16 | IMAGE B 2/16 |
| IMAGE R 3/16 | IMAGE G 3/16 | IMAGE B 3/16 |
| IMAGE R 4/16 | IMAGE G 4/16 | IMAGE B 4/16 |
| *FIG. 25A* | *FIG. 25E* | *FIG. 25I* |

| MEMORY B (R) | MEMORY B (G) | MEMORY B (B) |
|---|---|---|
| IMAGE R 5/16 | IMAGE G 5/16 | IMAGE B 5/16 |
| IMAGE R 6/16 | IMAGE G 6/16 | IMAGE B 6/16 |
| IMAGE R 7/16 | IMAGE G 7/16 | IMAGE B 7/16 |
| IMAGE R 8/16 | IMAGE G 8/16 | IMAGE B 8/16 |
| *FIG. 25B* | *FIG. 25F* | *FIG. 25J* |

| MEMORY C (R) | MEMORY C (G) | MEMORY C (B) |
|---|---|---|
| IMAGE R 9/16 | IMAGE G 9/16 | IMAGE B 9/16 |
| IMAGE R 10/16 | IMAGE G 10/16 | IMAGE B 10/16 |
| IMAGE R 11/16 | IMAGE G 11/16 | IMAGE B 11/16 |
| IMAGE R 12/16 | IMAGE G 12/16 | IMAGE B 12/16 |
| *FIG. 25C* | *FIG. 25G* | *FIG. 25K* |

| MEMORY D (R) | MEMORY D (G) | MEMORY D (B) |
|---|---|---|
| IMAGE R 13/16 | IMAGE G 13/16 | IMAGE B 13/16 |
| IMAGE R 14/16 | IMAGE G 14/16 | IMAGE B 14/16 |
| IMAGE R 15/16 | IMAGE G 15/16 | IMAGE B 15/16 |
| IMAGE R 16/16 | IMAGE G 16/16 | IMAGE B 16/16 |
| *FIG. 25D* | *FIG. 25H* | *FIG. 25L* |

| MEMORY A (R) |
|---|
| IMAGE R1 |
| IMAGE R2 |
| IMAGE R3 |
| IMAGE R4 |

*FIG. 26A*

| MEMORY B (R) |
|---|
| IMAGE R5 |
| IMAGE R6 |
| IMAGE R7 |
| IMAGE R8 |

*FIG. 26B*

| MEMORY C (R) |
|---|
| IMAGE R9 |
| IMAGE R10 |
| IMAGE R11 |
| IMAGE R12 |

*FIG. 26C*

| MEMORY D (R) |
|---|
| IMAGE R13 |
| IMAGE R14 |
| IMAGE R15 |
| IMAGE R16 |

*FIG. 26D*

| MEMORY A (G) |
|---|
| IMAGE G1 |
| IMAGE G2 |
| IMAGE G3 |
| IMAGE G4 |

*FIG. 26E*

| MEMORY B (G) |
|---|
| IMAGE G5 |
| IMAGE G6 |
| IMAGE G7 |
| IMAGE G8 |

*FIG. 26F*

| MEMORY C (G) |
|---|
| IMAGE G9 |
| IMAGE G10 |
| IMAGE G11 |
| IMAGE G12 |

*FIG. 26G*

| MEMORY D (G) |
|---|
| IMAGE G13 |
| IMAGE G14 |
| IMAGE G15 |
| IMAGE G16 |

*FIG. 26H*

| MEMORY A (B) |
|---|
| IMAGE B1 |
| IMAGE B2 |
| IMAGE B3 |
| IMAGE B4 |

*FIG. 26I*

| MEMORY B (B) |
|---|
| IMAGE B5 |
| IMAGE B6 |
| IMAGE B7 |
| IMAGE B8 |

*FIG. 26J*

| MEMORY C (B) |
|---|
| IMAGE B9 |
| IMAGE B10 |
| IMAGE B11 |
| IMAGE B12 |

*FIG. 26K*

| MEMORY D (B) |
|---|
| IMAGE B13 |
| IMAGE B14 |
| IMAGE B15 |
| IMAGE B16 |

*FIG. 26L*

| MEMORY A (R) | MEMORY A (G) | MEMORY A (B) |
|---|---|---|
| IMAGE R1-1/2 | IMAGE G1-1/2 | IMAGE B1-1/2 |
| IMAGE R1-2/2 | IMAGE G1-2/2 | IMAGE B1-2/2 |
| IMAGE R3 | IMAGE G3 | IMAGE B3 |
| IMAGE R4 | IMAGE G4 | IMAGE B4 |
| *FIG. 27A* | *FIG. 27E* | *FIG. 27I* |

| MEMORY B (R) | MEMORY B (G) | MEMORY B (B) |
|---|---|---|
| IMAGE R5 | IMAGE G5 | IMAGE B5 |
| IMAGE R6-1/7 | IMAGE G6-1/7 | IMAGE B6-1/7 |
| IMAGE R6-2/7 | IMAGE G6-2/7 | IMAGE B6-2/7 |
| IMAGE R6-3/7 | IMAGE G6-3/7 | IMAGE B6-3/7 |
| *FIG. 27B* | *FIG. 27F* | *FIG. 27J* |

| MEMORY C (R) | MEMORY C (G) | MEMORY C (B) |
|---|---|---|
| IMAGE R9 | IMAGE G9 | IMAGE B9 |
| IMAGE R10 | IMAGE G10 | IMAGE B10 |
| IMAGE R6-4/7 | IMAGE G6-4/7 | IMAGE B6-4/7 |
| IMAGE R6-5/7 | IMAGE G6-5/7 | IMAGE B6-5/7 |
| *FIG. 27C* | *FIG. 27G* | *FIG. 27K* |

| MEMORY D (R) | MEMORY D (G) | MEMORY D (B) |
|---|---|---|
| IMAGE R6-6/7 | IMAGE G6-6/7 | IMAGE B6-6/7 |
| IMAGE R6-7/7 | IMAGE G6-7/7 | IMAGE B6-7/7 |
| IMAGE R15 | IMAGE G15 | IMAGE B15 |
| IMAGE R16 | IMAGE G16 | IMAGE B16 |
| *FIG. 27D* | *FIG. 27H* | *FIG. 27L* |

| MEMORY A (R) | MEMORY A (G) | MEMORY A (B) |
|---|---|---|
| C 1 | M 1 | Y 1 |
| C 2 | M 2 | Y 2 |
| C 3 | M 3 | Y 3 |
| Bk1 | Bk3 | Bk5 |

| MEMORY B (R) | MEMORY B (G) | MEMORY B (B) |
|---|---|---|
| C 4 | M 4 | Y 4 |
| C 5 | M 5 | Y 5 |
| C 6 | M 6 | Y 6 |
| Bk2 | Bk4 | Bk6 |

| MEMORY C (R) | MEMORY C (G) | MEMORY C (B) |
|---|---|---|
|  |  |  |
|  |  |  |
|  |  |  |
|  |  |  |

| MEMORY D (R) | MEMORY D (G) | MEMORY D (B) |
|---|---|---|
|  |  |  |
|  |  |  |
|  |  |  |
|  |  |  |

APPARATUS FOR REPRODUCING VISIBLE COLOR IMAGE FROM COLOR SEPARATIONS

This application is a continuation of application Ser. No. 07/436,769 filed Nov. 15, 1989, now abandoned.

BACKGROUND OF THE INVENTION

1. Field of the Invention

The present invention relates to an image memory apparatus for storing input image information.

2. Related Background Art

There are recently introduced digital televisions, digital video cassette recorders etc. for temporarily storing the input color image information in memory means such as a semiconductor memory and processing thus stored image information afterwards.

However such an apparatus merely has a function of storing the image signals in the memory, and the frame size of the source of said image signals is also fixed.

On the other hand, for connecting with video signals, color scanner, computer etc., there are encountered various source images having different numbers of pixels and having different aspect ratios, and the conventional image memory apparatus capable solely of sequential function is unable to cope with such images.

Also in the printing field, in the preparation of yellow, magenta, cyan and black plates, the adequateness of each plate cannot be evaluated unless each plate is actually printed on a printing press.

SUMMARY OF THE INVENTION

An object of the present invention is to provide an image memory apparatus capable of resolving the above-mentioned drawbacks individually or entirely.

Another object of the present invention is to provide an image memory apparatus capable of handling images of various sources.

Still another object of the present invention is to provide an image memory apparatus capable of handling images of various sources with a memory of a limited capacity.

The foregoing objects can be attained, according to a preferred embodiment of the present invention, by an image memory apparatus provided with a memory means for storing input image information. A control means provides or independently controlling divided portions of the memory means. A selection means allocates a certain number of divided portions of the memory means in consideration of the number of pixels of the input image signals. A comparator means compares the number of pixels of the input image signals with the number of pixels of the allocated memory means, and a reduction means reduces the input image information based on the result of said comparison.

Still another object of the present invention is to provide a system enabling to easily predict the actual color printed image from the color-separated plates for printing.

Still another object of the present invention is to provide a system enabling to predict, in high quality and at a high speed, the actual color printed image from the color-separated plates.

Still other objects of the present invention, and the advantages thereof, will become fully apparent from the following description of the preferred embodiments which is to be taken in conjunction with the attached drawings.

BRIEF DESCRIPTION OF THE DRAWINGS

FIG. 2 combining FIGS. 2A and 2B, is a block diagram of a color reader 1 in said embodiment;

FIGS. 10A, 10A-1, 10A-2, 10B, 10B-1, 10B-2, and 10C are detailed block diagrams of the image memory apparatus of said embodiment;

FIG. 16 is a map of image information in the image memory of the image memory apparatus of said embodiment;

FIG. 23 is a timing chart of image forming process of said embodiment;

FIGS. 24A-C to 28A-L are views showing image data allocation in the memory divided into plural blocks.

DESCRIPTION OF THE PREFERRED EMBODIMENTS

In the following there will be disclosed, as an embodiment of the present invention, an image memory apparatus provided with control means capable of controlling the image memory means in divided manner and also capable of independently controlling three memories in addition to the functions of the present invention, thereby storing the signals of cyan, magenta and yellow in ¾ of the image memory means for red, green and blue and storing the signals of black in the remainder of said memory means, thus enabling to use the memory means for red, green and blue also for storing the signals of cyan, magenta, yellow and black.

Embodiment 1

Figure 1:
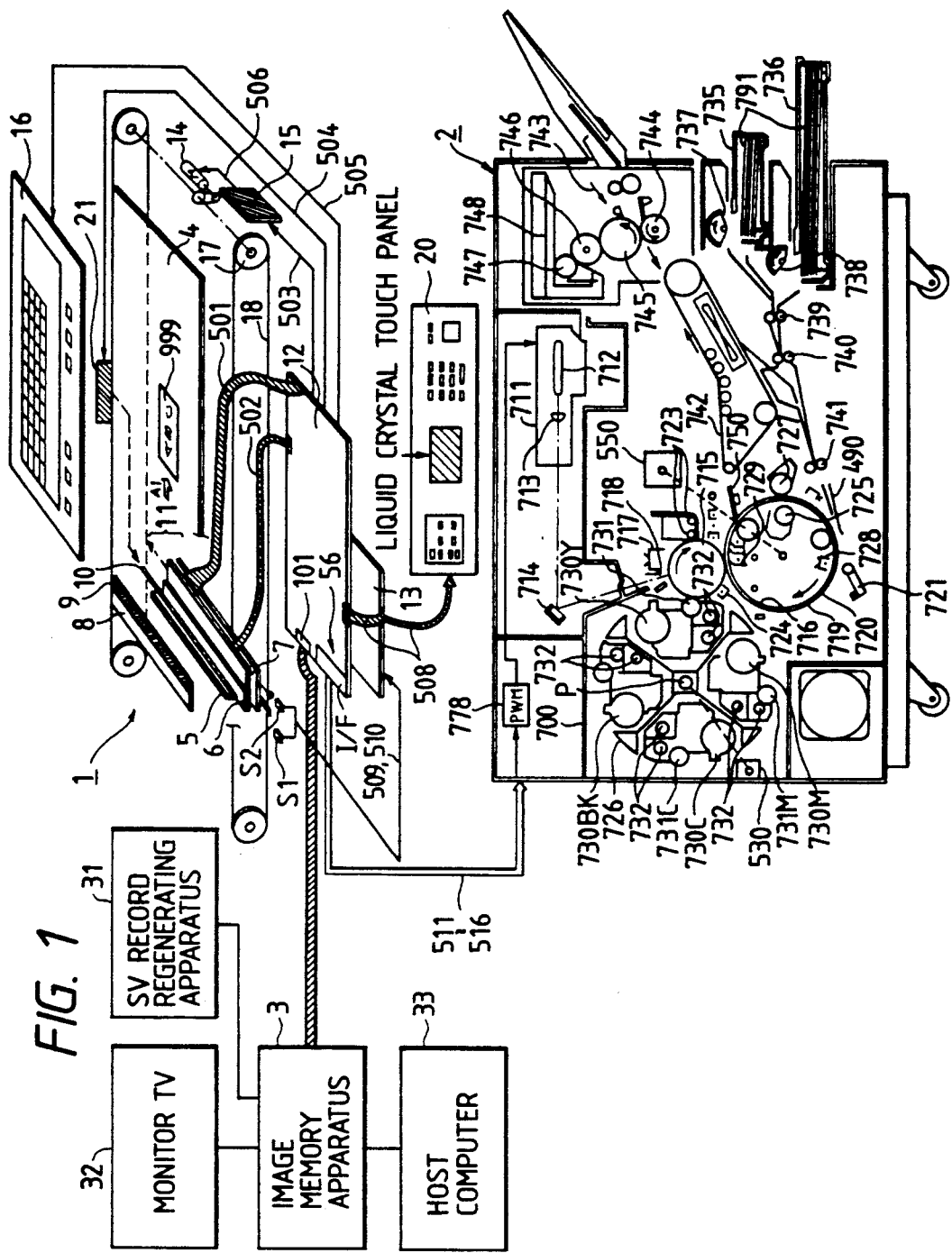
FIG. 1 is a system diagram of an embodiment of the present invention.
Figure 2B:
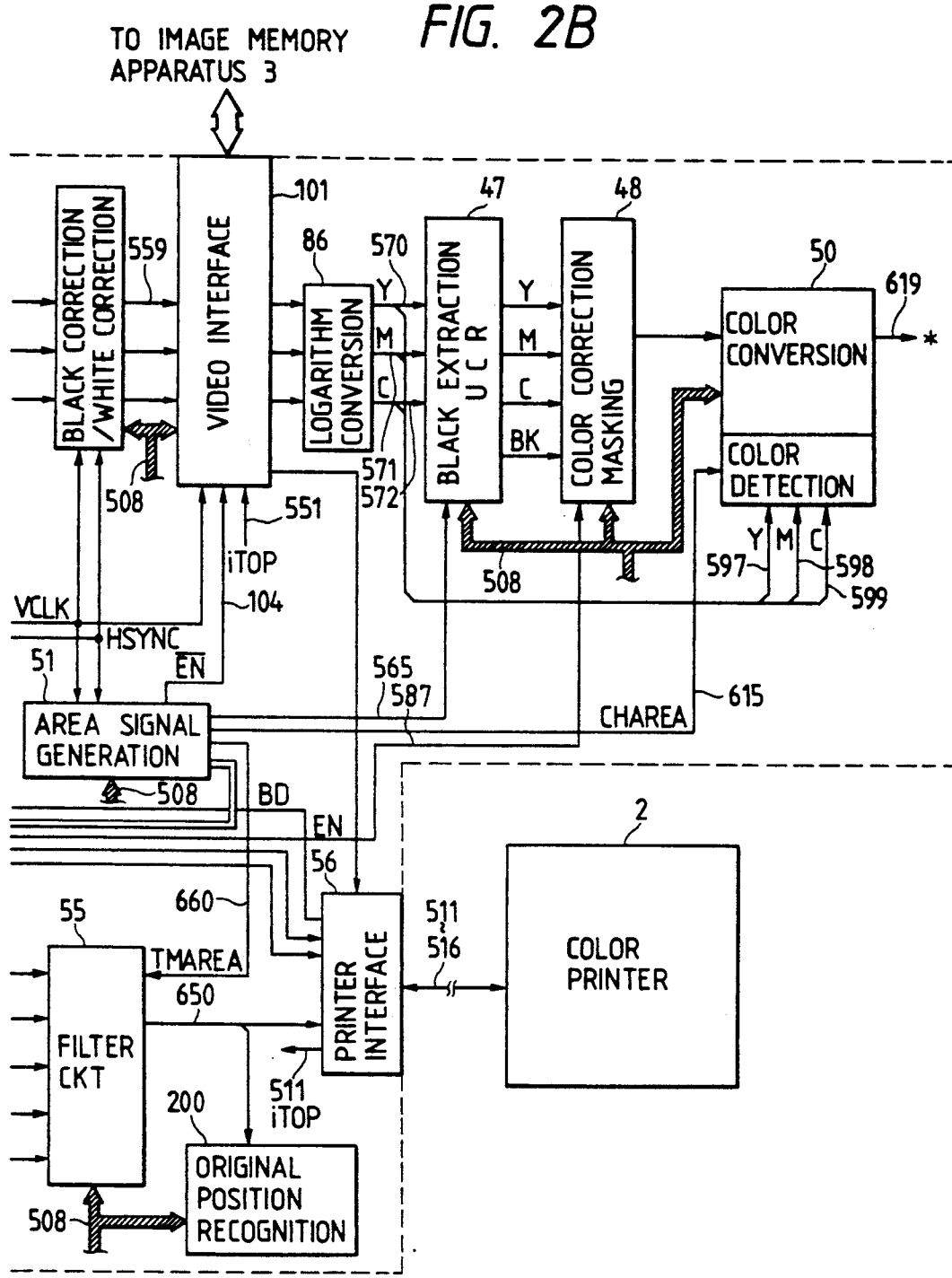

FIG. 1 is a system diagram of a color image forming system constituting an embodiment of the present invention, composed of a color image reading unit (hereinafter called color reader) 1 for reading a color image in digital manner, positioned above as shown in FIG. 1; a digital color image printing unit (hereinafter called color printer) 2 positioned in a lower part and printing a digital color image; an image memory apparatus 3; a SV record/regenerating unit 31; a monitor television unit 32; and a host computer 33.

The color reader 1 of the present embodiment reads the color image information of an original image in individual colors and converts said information into electrical digital image signals by means of color separation means to be explained later and a photoelectric converting element composed for example of a CCD.

The color printer 2 is composed of an electrophotographic laser beam color printer capable of forming images of individual colors according to the digital image signals and transferring said images plural times in digital dots onto a recording sheet.

The image memory apparatus 3 digitizes the digital image signals from the color reader 1 or the analog video signals from the SV record/regenerating unit 31 and stores the obtained digital image signals.

The SV record/regenerating unit 31 regenerates the image information, obtained in an SV camera and stored on an SV floppy disk, in the form of analog video signals. Said unit 31 is also capable of storing input analog video signals on a floppy disk.

The monitor television unit 32 displays the image stored in the image memory apparatus 3 or the analog video signals supplied from the SV record/ regenerating unit 31.

The host computer 33 transmits image information to the image memory apparatus 3, and receives the image information supplied from the color reader 1 or the SV record/regenerating unit and stored in the image memory apparatus 3. It also controls the color reader 1 and the color printer 2.

These units will be explained individually in the following.

Color reader 1

Referring to FIG. 1, there are shown an original document 999, a platen glass 4 for supporting said original, and a rod lens array 5 for guiding the light reflected from the original, scan illuminated by a halogen exposure lamp 10, into a same-size full color image sensor 6. The rod lens array 5, the same-size full color image sensor 6, a sensor output signal amplifier circuit 7 and the halogen exposure lamp 10 integrally constitute an original scanning unit 11 which scans the original 999 in a direction A1, thereby reading the image information thereof line by line. The obtained color-separated image signal is amplified to a predetermined voltage level by the amplifier circuit 7, and is supplied to a video processing unit for signal processing through a signal line 501, which is composed of a concentric cable for achieving accurate signal transmission. A signal line 502 serves to supply driving pulses for the color image sensor 6, and all the necessary driving pulses are generated in the video processing unit 12. White and black boards 8, 9, for correcting the white and black levels of the image signal, generate signals of predetermined levels when illuminated by the exposure lamp 10.

A control unit 13, for controlling the entire color reader 1 by a microcomputer, controls the display and key inputs of an operation panel 20, and the video processing unit 12 through a bus 508. It also detects the position of the original scanning unit 11 through position sensors S1, S2 and signal lines 509, 510.

It also controls a stepping motor driving circuit 15 for driving a stepping motor 14 for moving the original scanning unit 11 through a signal line 503; an exposure lamp driver 21 for on/off control and intensity control of the halogen exposure lamp 10 through a signal line 504; and the digitizer 16 and the keys and displays of the color reader 1 through a signal line 505.

The color image signal obtained by the original scanning unit 11 in the scanning exposure of the orignal document is supplied to the video processing unit 12 through the amplifier circuit 7 and the signal line 501.

In the following there will be explained, with reference to FIG. 2, the details of the original scanning unit 11 and the video processing unit 12.

The color image signal supplied to the video processing unit 12 is separated into three colors of green (G), blue (B) and red (R) by a sample hold circuit (S/H) 43. Each color-separated image signal is analog processed in an analog color signal processing circuit 44 and is A/D converted to obtain a digital color image signal.

Figures 1, 10A:
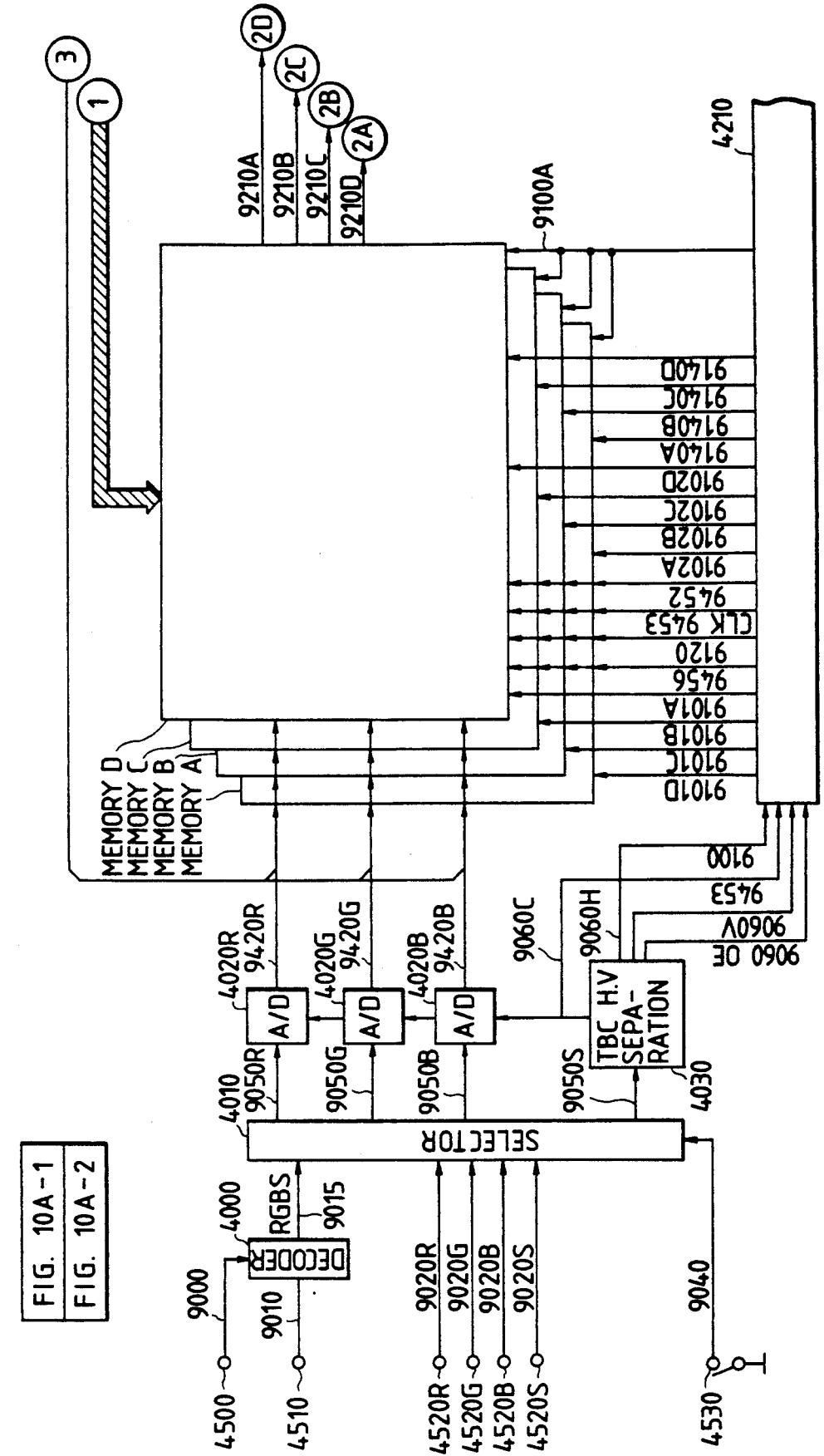
Figures 2, 10A:
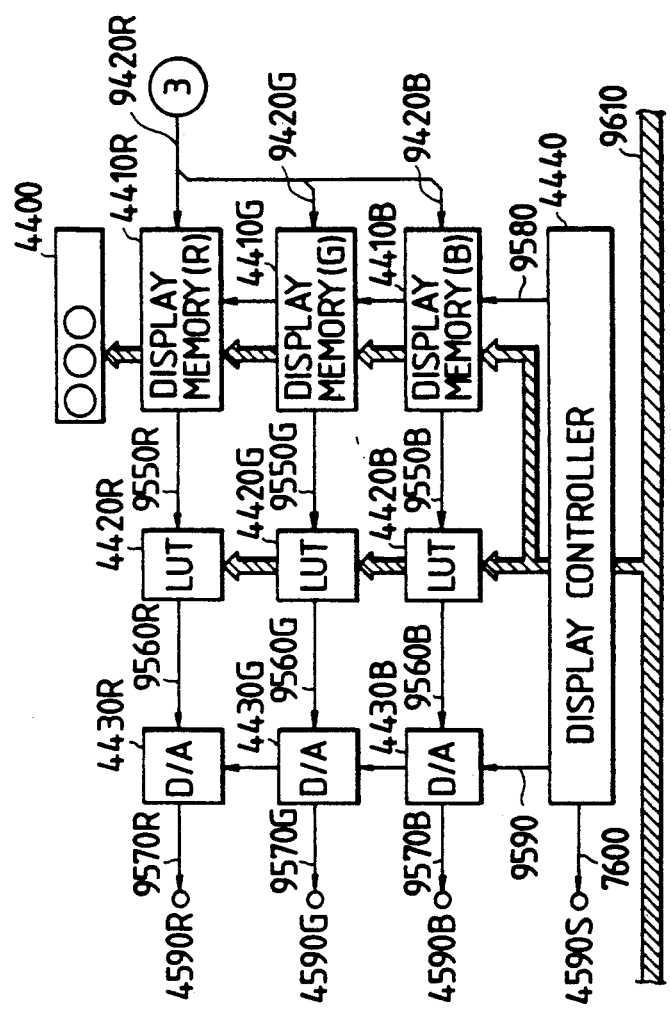

In the present embodiment, the color image sensor 6 in the original scanning unit 11 has five sensor areas of a staggered arrangement as shown in FIG. 2. The aberration in image reading position between the leading channels 2, 4 and the trailing channels 1, 3, 5 is compensated by said sensor 6 and a first-in-first-out (FIFO) memory 46. The position-corrected signal from the FIFO memory 46 enters a black correction/white correction circuit which compensates the dark level fluctuation of the sensor 6, intensity fluctuation of the exposure lamp 10 and sensitivity fluctuation of the sensor 6 utilizing the signals corresponding to the aforementioned white and black boards 8, 9.

The color image data, proportional to the input light to the sensor 6, are then supplied to a video interface 101 which is connected to the image memory apparatus 3.

Figure 3:
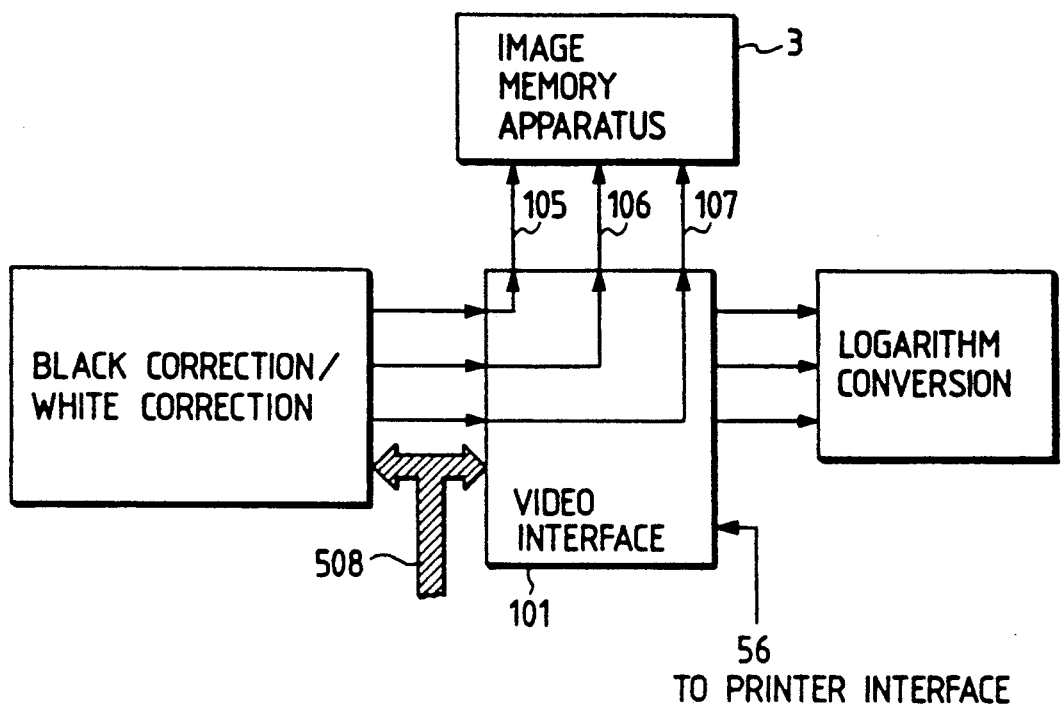
FIGS. 3 to 6 are schematic views showing an example of switching control of a video interface unit of the color reader 1.
Figure 4:
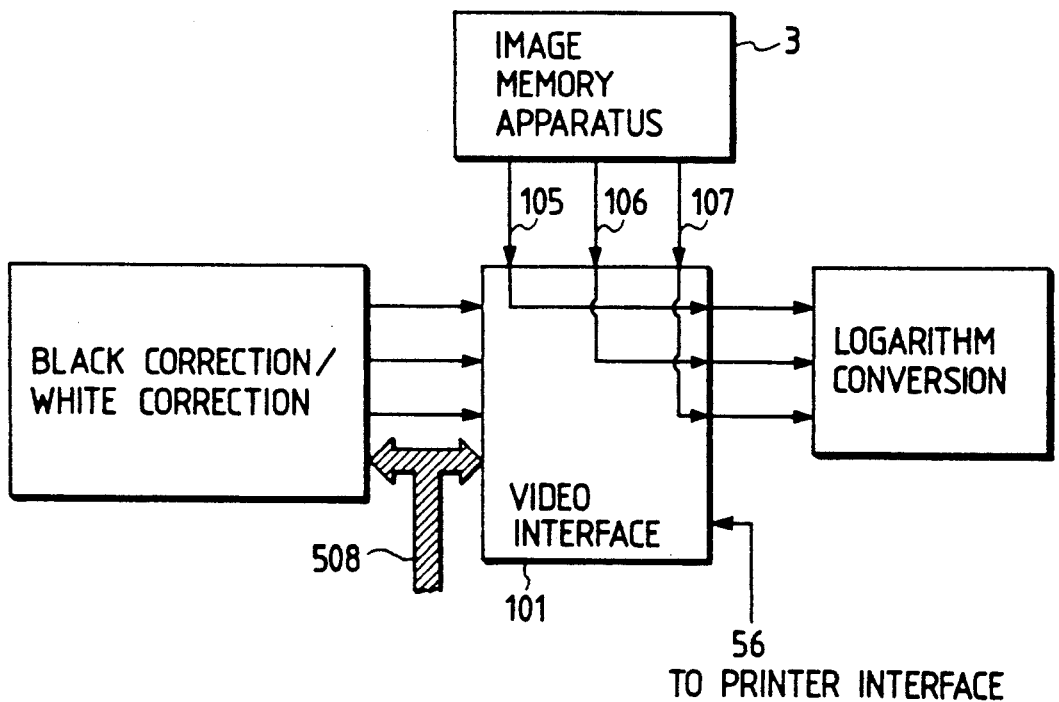

Said video interface 101 has, as shown in FIGS. 3 to 6, four functions of:

(1) sending the signal 559 from the black correction/-white correction circuit to the image memory apparatus 3 (FIG. 3);

(2) sending the image information from the image memory apparatus 3 to a logarithmic conversion circuit 86 (FIG. 4);

(3) sending the image information from a printer interface 56 to the image memory apparatus (FIG. 5); and (4) sending the signal 559 from the black correction/-white correction circuit to the logarithmic conversion circuit 86 (FIG. 6), and these four functions are selected by a CPU control line 508 as shown in FIGS. 3 to 6.

Image memory apparatus 3

In the following there will be explained the reading control in the color reader 1 and the memory control of the obtained image information into the image memory apparatus 3 in the present embodiment.

Figure 7:
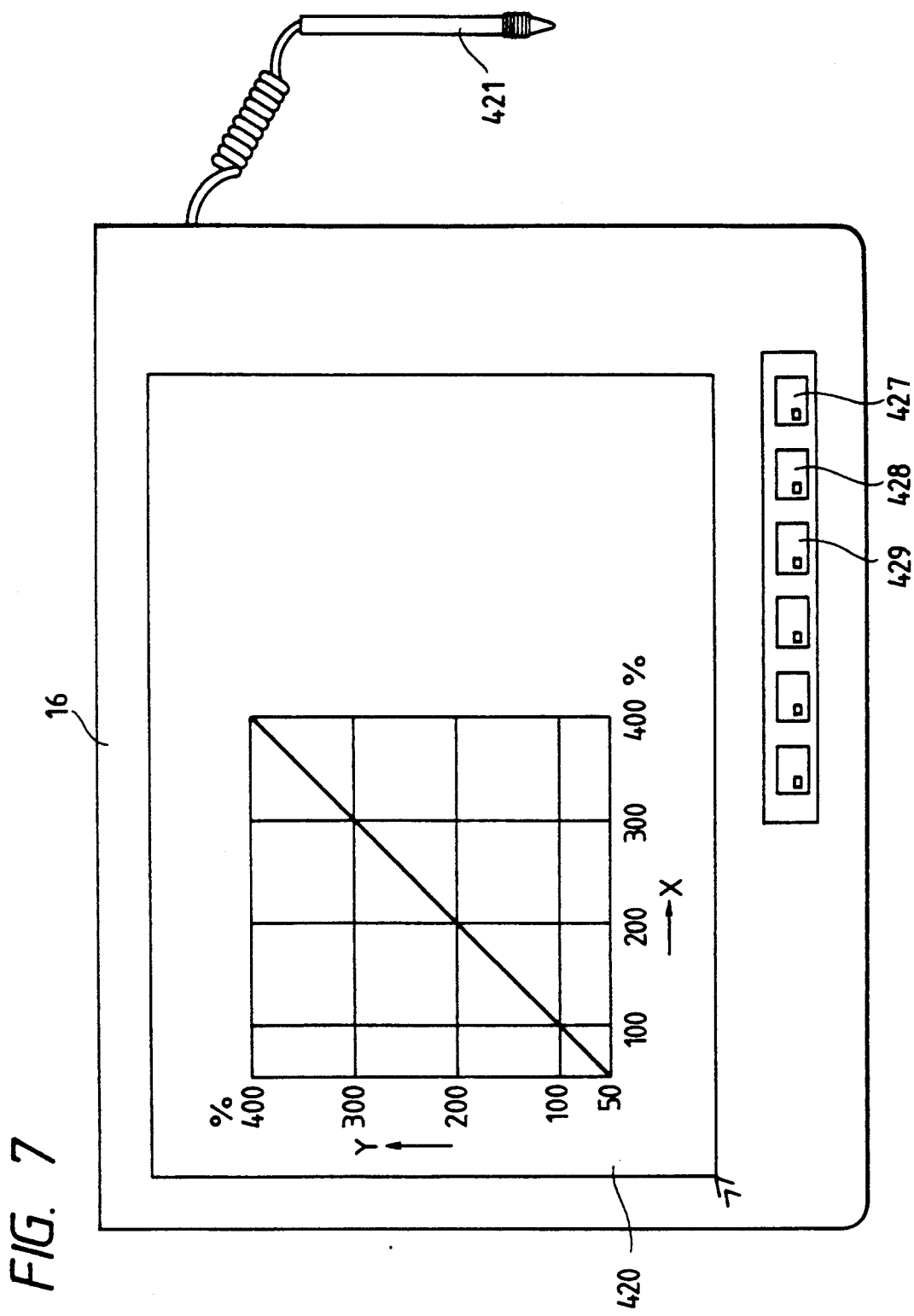
FIG. 7 is an external view of a digitizer employed in said embodiment.

The reading operation of the color reader 1 is determined by the digitizer to be explained in the following, of which external view is shown in FIG. 7.

In FIG. 7, there are shown an entry key 427 for transferring the image data from the color reader 1 to the image memory apparatus 3; a coordinate detection board 420 for selecting an image reading area in arbitrary manner or selecting the image reading magnification; and a pointer pen 421 for designating coordinates.

For sending the image data of an arbitrary area on the original to the image memory apparatus 3, the entry key 427 shown in FIG. 7 is depressed and then the reading area is designated by the pointer pen 421.

Data on said reading area is sent, through a signal line 505 shown in FIG. 1, to the video processing unit 12 which transfer said signal through a CPU control line 508 and the video interface 101 to the image memory apparatus 3.

If the reading area is not designated by the pointer pen 421 after the depression of the entry key 427, the color image reader 1 detects the size of the original 999 by a pre-scanning, and the obtained size information is sent, as the data for the reading area, to the image memory apparatus 3 through the video interface 101.

The process of sending the information on reading area to the image memory apparatus 3 is conducted in the following manner.

Figure 8:
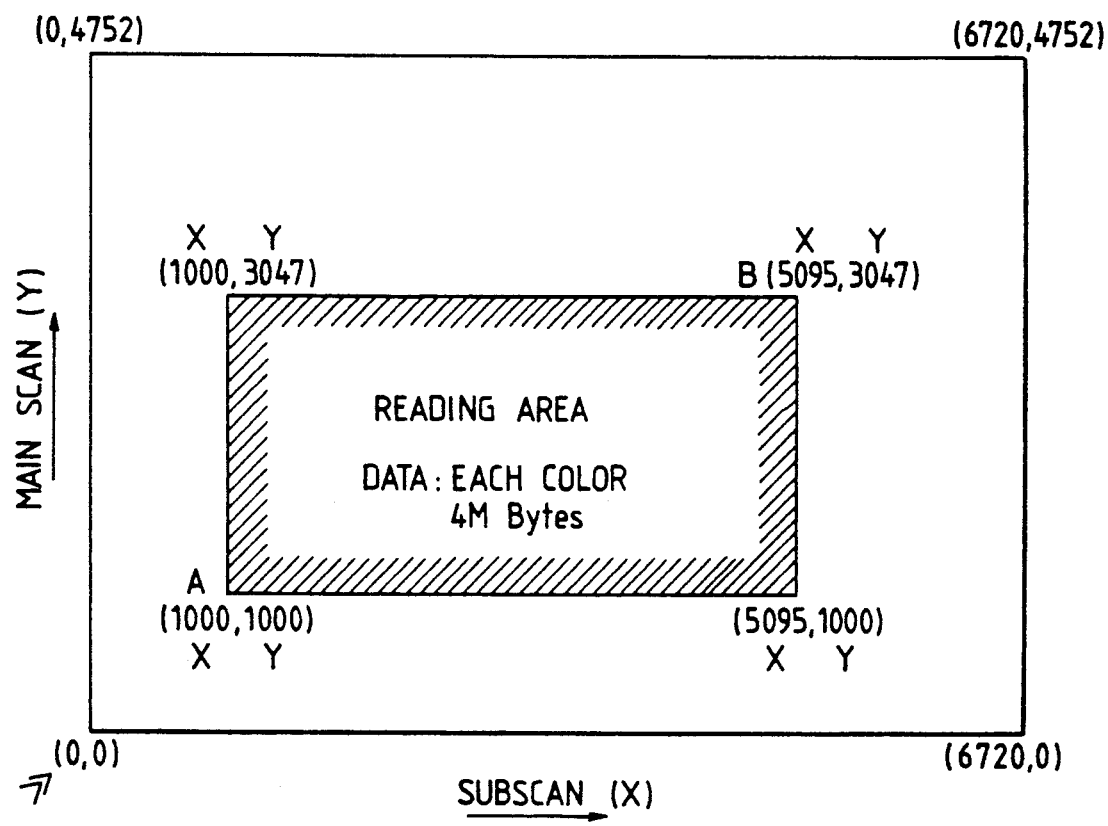
FIG. 8 is a view indicating the address information designated by said digitizer.

FIG. 8 shows an example of address information on points A, B of an area designated by the pointer pen 421 of the digitizer 16.

Figure 9:
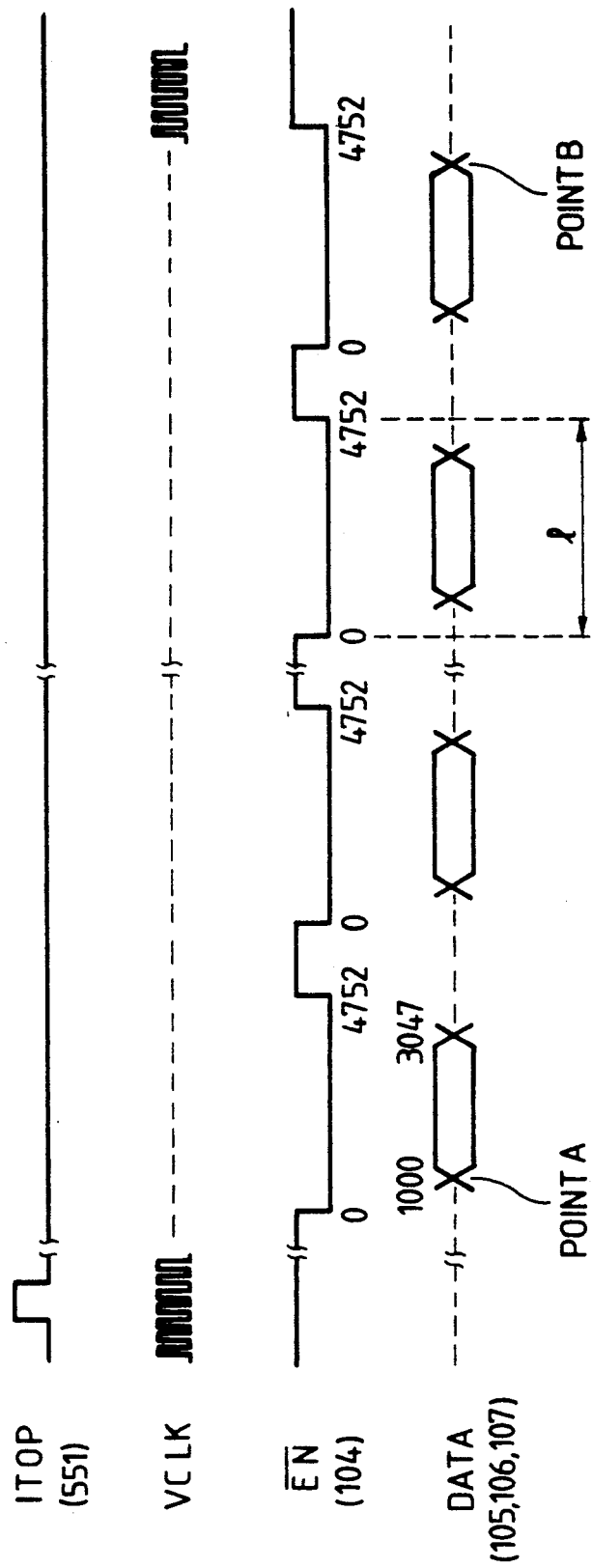
FIG. 9 is a timing chart of output signals from the interface unit to the image memory apparatus of said embodiment.

In addition to said reading area information, the video interface 101 supplies the image memory apparatus 3 with a VCLK signal, an ITOP signal 551, an $\overline{EN}$ signal 104 from an area signal generator circuit 51 etc., together with the image data, and the timings of these signals are shown in FIG. 9.

In response to the actuation of a start button in the operation unit 20, the stepping motor is activated to start the scanning motion of the original scanning unit 11. When it reaches the leading end of the original, the image top signal ITOP 551 is shifted to "1". Then, the enable signal $\overline{EN}$ 104 is shifted to "1" while the scanning unit 11 scans the area designated by the digitizer 16. Thus the color image data (105, 106, 107) can be fetched dueing the state "1" of said signal.

As shown in FIG. 9, the data R (105), G (106) and B (107) from the color image reader 1 are sent on real time basis to the image memory apparatus 3 in synchronization with the ITOP signal 551, $\overline{EN}$ signal 104 and VCLK signal through the control of the video interface 101 as shown in FIG. 3.

In the following there will be explained the mode of memory of the image memory apparatus 3 in response to said image data and control signals, with reference to FIGS. 10A and 10B.

A connector 4550 is connected to the video interface 101 of the color image reader 1 through a cable, and the data R (105), G (106) and B (107) are supplied to a selector 4250 respectively through lines 9430R, 9430G and 9430B. The control signals VCLK, $\overline{EN}$ 104 and ITOP 551 from the video interface 101 are directly supplied to a system controller 4210 through a signal line 9450. The area information designated by the digitizer 16 prior to the original reading is supplied through a signal line 9460 to a reader controller 4270, and is read by the CPU 4360 through a CPU bus 9610.

The R, G and B data 105, 106, 107 supplied to the selector 4250 through the lines 9430R, 9430G, 9430B are selected by said selector 4250, and are supplied to FIFO memories 4050R, 4050G, 4050B through signal lines 9420R, 9420G, 9420B.

Figure 11:
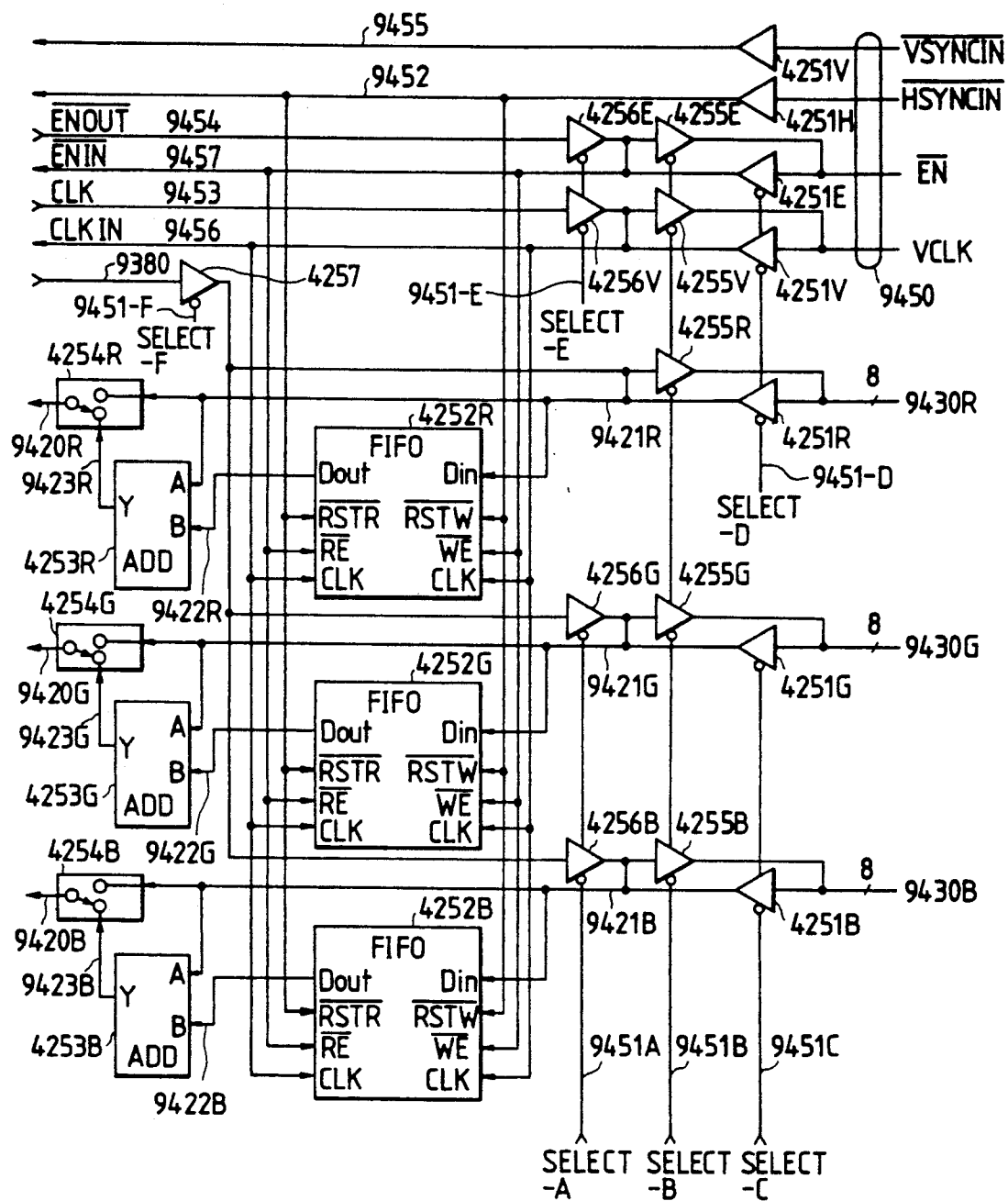
FIG. 11 is a detailed circuit diagram of a selector unit of the image memory apparatus of said embodiment.

The details of said selector 4250 are shown in FIG. 11.

In case of storing the image information from the color image reader 1 to the image memory apparatus 3, the system controller 4210 sets the control signals SELECT-A.9451A at "1", SELECT-B.9451B at "1", SELECT-C.9451C at "0", SELECT-D.9451D at "0", SELECT-E.9451E at "1" and SELECT-F.9451F at "1", thereby activating tristate buffers 4251E, V, R, G and B only while maintaining other tristate buffers 4255E, V, R, G, B and 4256E, V, R, G, B in the high impedance state.

Also among the control signals 9450, the signals VCLK and $\overline{EN}$ are selected by the SELECT signals 9451A, B, C. In case of storing the image information from the color image reader 1 in the image memory apparatus 3, said signals VCLK, $\overline{EN}$ are supplied from the color image reader 1 and are supplied to the system controller 4210 through signal lines CLKIN 9456, $\overline{ENIN}$ 9457 as the tristate buffers 4251E, V only are activated.

Also control signals $\overline{VSYNCIN}$ 9455 and $\overline{HSYNCIN}$ 9452 are directly supplied from a connector 4550 to the system controller 4210.

The selector 4250 also has a function of averaging the image information from the color image reader 1. Signals 9430R, 9430G, 9430B supplied from the color image reader are supplied to FIFO memories 4252R, 4252G, 4252B through signal lines 9421R, 9421G, 9421B.

Output signals from the FIFO memories 4252R, 4252G, 4252B are delayed, by a main scanning period, with respect to the image information 9421R, 9421G, 9421B, and are supplied through signal lines 9422R, 9422G, 9422B to adders 4253R, 4253G, 4253B, which also receive signals 9421R, 9421G, 9421B from selectors 4251R, 4251G, 4251B. Said adders respectively produce the average of four pixels which are composed of two pixels in the main scanning direction and two pixels in the sub scanning direction, and release the obtained results to signal lines 9423R, 9423G, 9423B.

Selectors 4254R, 4254G, 4254B select either the image signals 9421R, 9421G, 9421B from the color image reader 1 or the averaged signals 9423R, 9423G, 9423B as signals 9420R, 9420G, 9420B and send them to FIFO memories 4050R, 4050G, 4050B.

The system controller 34210 transfers the effective image areas of the image data 9420R, 9420G, 9420B from the selectors 4254R, 4254G, 4254B to the FIFO memories 4050R, 4050G, 4050B. At the same time, the system controller 4210 effects the image trimming and the image magnification change.

The FIFO memories 4050R, 4050G, 4050B serve to absorb the difference in clock signals between the color image reader 1 and the image memory apparatus 3.

These processes of the present embodiment will be explained in the following, with reference to a circuit diagram shown in FIG. 12 and a timing chart shown in FIG. 13.

Prior to the data transfer from the selectors 4253R, 4253G, 4253B to the FIFO memories 4050R, 4050G, 4050B, the effective area in the main scanning direction of the area designated by the digitizer 16 is recorded in comparators 4232, 4233 through a CPU bus 9610.

The comparators 4232, 4233 respectively store the start address and the stop address of said area in the main scanning direction, designated by the digitizer 16.

Said area in the sub scanning direction, designated by the digitizer 16, is enabled by the selection of the CPU bus 9610 through the selector 4213. Thus data "0" and "1" are respectively written in the enabled area and disabled area in a RAM 4212.

The change in magnification in the main scanning direction is conducted by setting the rate of magnification change in a rage multiplier 4234 through the CPU bus 9610. That in the sub scanning direction can be achieved by controlling the data to be written in the RAM 4212.

Figure 13:
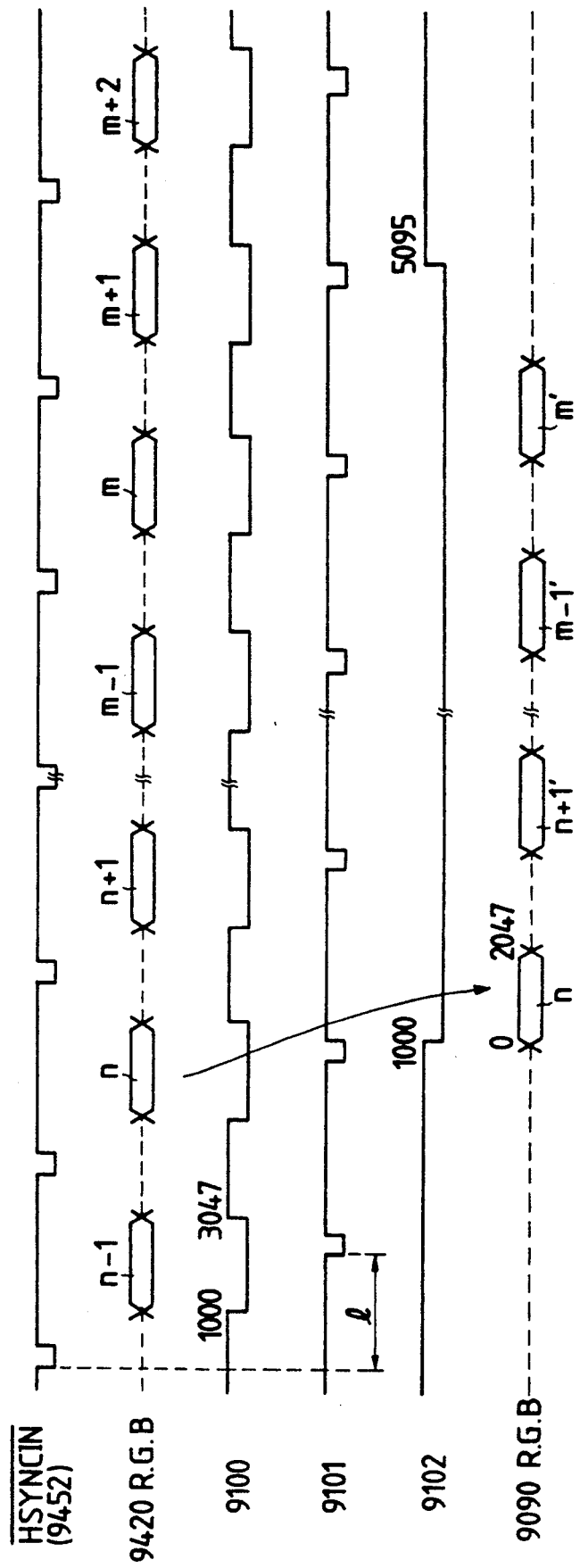
FIG. 13 is a timing chart of data storage into the FIFO memory of the system controller in the equal-size processing of said embodiment.

FIG. 13 is a timing chart in case of a trimming process. In case of storing only the area designated by the digitizer 16 into the memory (trimming), the trimming positions in the main scanning direction are set in the comparators 4232, 4233, while the trimming position in the sub scanning direction are recorded in the RAM 4212 by the CPU, through the CPU bus 9610 selected by the selector 4213 (example: trimming area 1000-3047 in the main scan direction and 1000-5095 in the sub scan direction).

A trimming section signal 9100 in the main scanning direction is obtained in the following manner. A counter 4230 is activated in synchronization with the HSYNCIN signal 9452 and CLKIN singal 9456. When the output signal 9103 of said counter reaches "1000", the comparator 4232 provides an output signal "1", whereby a flip-flop 4235 provides an output signal "1". Then, when said counter output signal 9103 reaches "3047", the comparator 4233 provides an output "1", whereby the output of the flip-flop 4235 is shifted from "1"to "0". Since FIG. 13 shows the case of same-size processing, the output of the rate multiplier 4234 is "1". Corresponding to the trimming section signal 9100, the color image signals, of addresses from 1000 to 3047, are respectively recorded in the FIFO memories 4050R, G, B.

The comparator 4231 releases a signal 9102, which is delayed by 1 pixels from the HSYNCIN signal 9452. Such phase difference between the inputs RSTW and RSTR to the FIFO memories 4050R, G, B allows to absorb the phase difference between the clock signals 9456 and 9453 supplied to said FIFO memories.

The trimming in the sub scanning direction is conducted by selecting a counter 4214 controlling a selector 4213, thereby releasing, from the RAM 4212, a section signal 9104 synchronized with the signals VSINCIN 9455 and HSYNCIN 9452. Said section signal 9104 is synchronized with the signal 9102 in a flip-flop 4211, and is supplied to the reset terminals of the FIFO memories 4050R, G, B. Thus the image information stored in said FIFO memories are released only in a section in which the trimming signal 9101 is "0" (n'−m').

In addition to the trimming process explained above, the change in image magnification is also possible. The magnification change in the main scanning direction is achieved by setting a rate of magnification change in the rate multiplier 4234 through the CPU bus 9610. That in the sub scanning direction is achieved by controlling the data stored in the RAM 4212.

Figure 14:
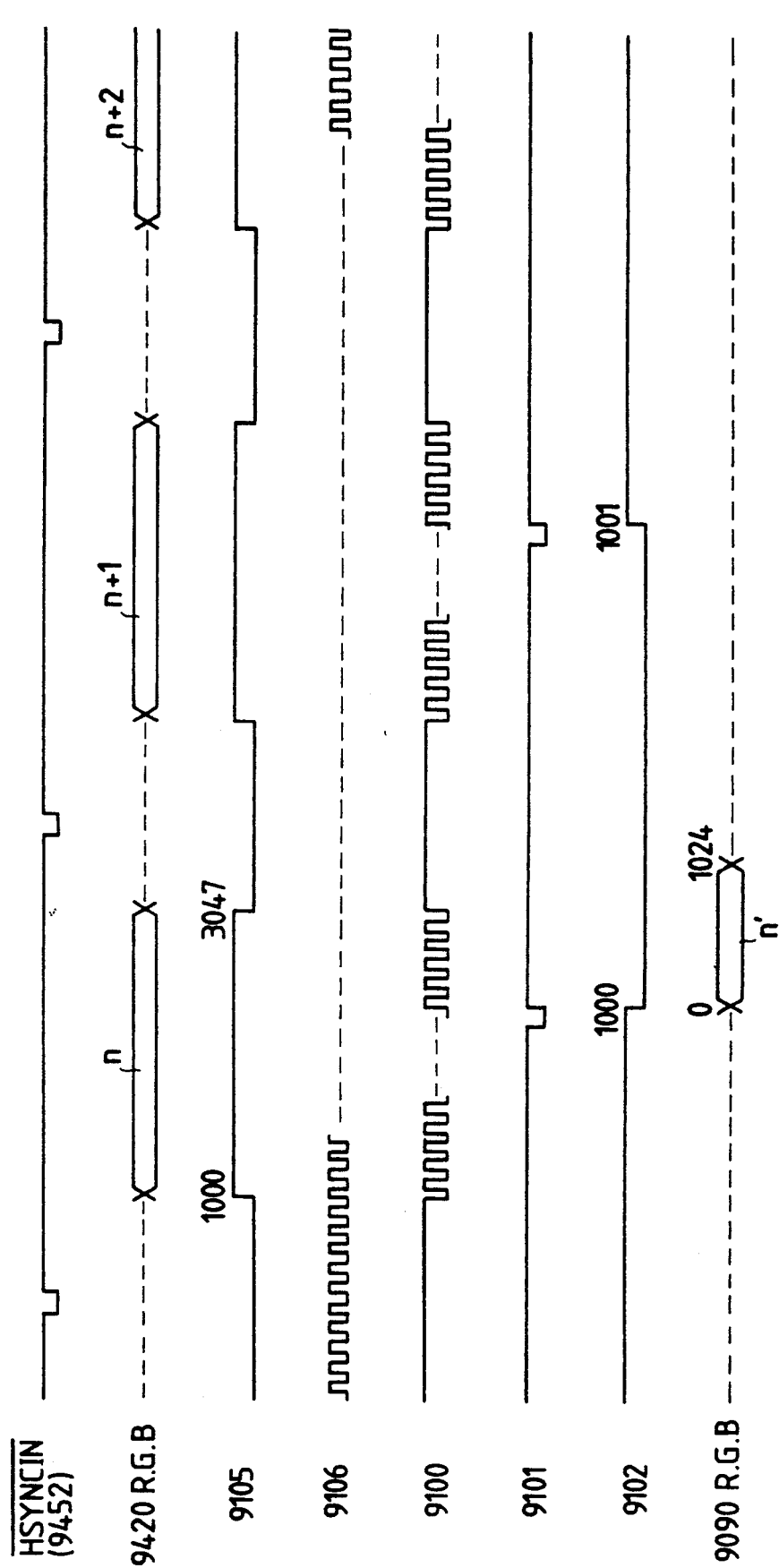
FIG. 14 is a timing chart of data storage into the FIFO memory of the system controller in the varied-size processing of said embodiment.

FIG. 14 is a timing chart with a trimming and a magnification change (50%).

In case of FIG. 14, the image data from the selectors 4254R, G, B are transferred to the FIFO memories 4050R, G, B after reduction by 50%.

Figure 12:
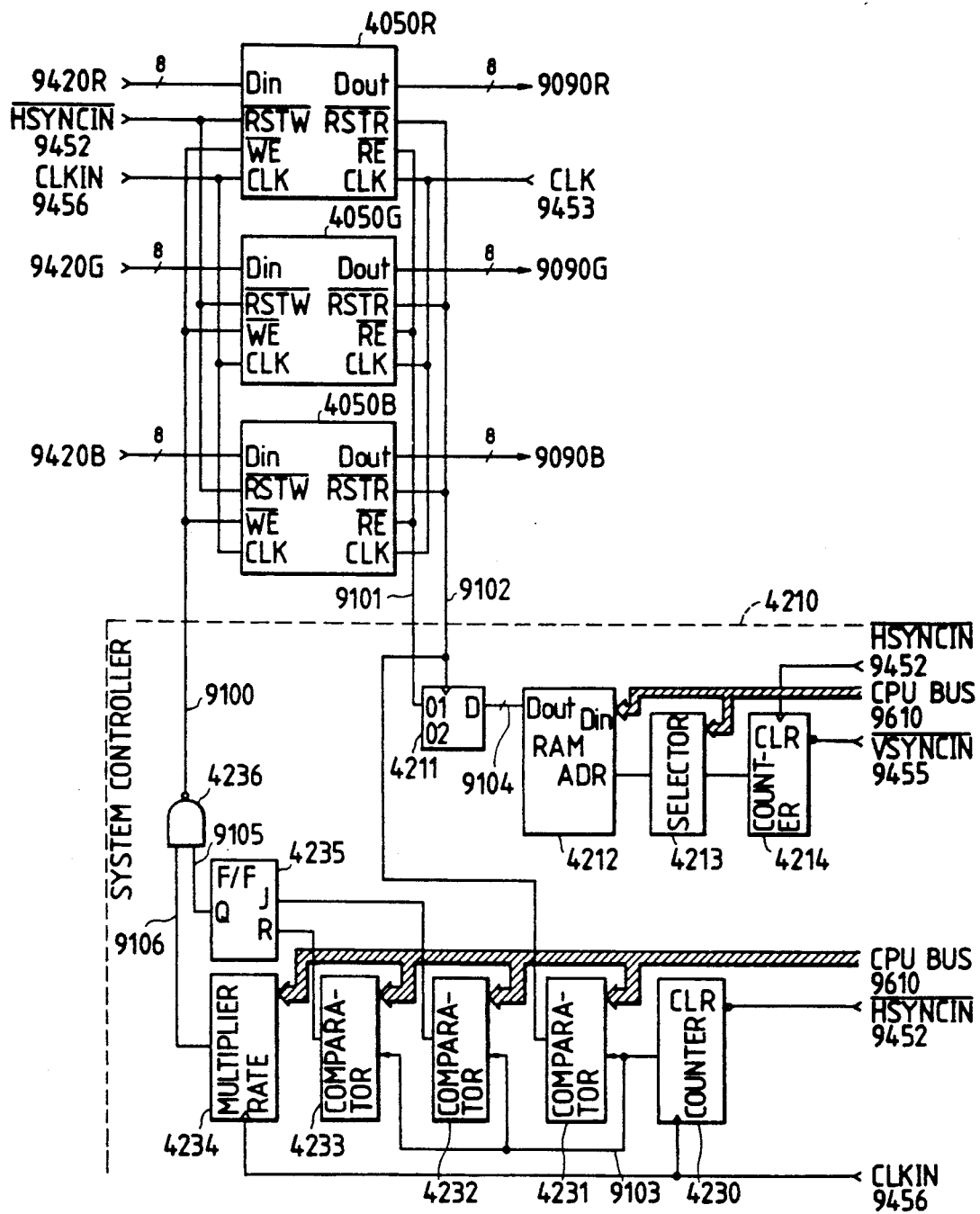
FIG. 12 is a detailed circuit diagram of a system controller and a first-in-first-out memory of the image memory apparatus of said embodiment.

In this case, a value for 50% reduction is set in the rate multiplier 4234, shown in FIG. 12, through the CPU bus 9610. The output 9106 of said rate multiplier is "0" and "1" alternated in every pixel in the main scanning direction, as shown in FIG. 14. A logic product signal 9100, obtained from said signal 9106 and the section signal 9105 from the comparators 4232, 4233 is used for enabling the signal writing in the FIFO memories 4050R, G, B, thereby achieving the image reduction.

In the sub scanning direction, the data to the RAM 4212 (read enable signal for the FIFO memories 4050R, G, B) is shifted to "1" (reading disabled) within the effective image data area as shown in FIG. 14, whereby the 50% reduced image data are supplied to the image memories 4060R, G, B. In case of FIG. 14, the 50% reduction is achieved by repeating "1" and "0" in said read enable signal 9101.

In summary, the trimming and the magnification change in the main scanning direction are achieved by controlling the write enable signal for the FIFO memories 4050R, G, B, and those in the sub scanning direction are achieved by controlling the read enable signal for said FIFO memories.

FIG. 10A shows four memory units. The data storage into one of said four memory units will be explained in the following, with reference to FIG. 10C, which is an internal block diagram of the memory units A-D.

The image data transfer from the FIFO memories 4050R, G, B to the memories 4060R, G, B is conducted by a counter 0 (4080−0) and a control line 9101.

The control line 9101 transmits not only the read enable signal for the FIFO memories 4050R, G, B but also the write enable signal for the memories 4060R, G, B.

When the control line 9101E is at "0", the image data read from the FIFO Memories 4050R, G, B are supplied through signal lines 9090R, G, B to the memories 4060R, G, B. In this state an enable line 9101-0 of a counter 4080-0 is also at "0", so that a count-up signal 9120-0 is released from the counter 4080-0 in synchronization with the clock signal 9453 and supplied through a selector 4070 to an address line 9110 of the memories 4060R, G, B.

At the same time the write enable lines WE 9101R, G, B of the memories 4060R, G, B are also at "0", so that the image data 9090R, G, B supplied to the memories 4060R, G, B are stored therein.

Memories in the present embodiment have a respectively capacity of 1 Mbytes. Thus the read image data are converted to the data of maximum memory capacity of the image memory apparatus 3 and stored therein, by 50% reduction of the image data of the reading area shown in FIG. 8.

Also in the present embodiment, the CPU 4360 calculates the effective area from the area information designated by the digitizer 16 of A3 size, and sets corresponding data in the comparators 4231-4233, rate multiplier 4234 and RAM 4212.

Figure 15:
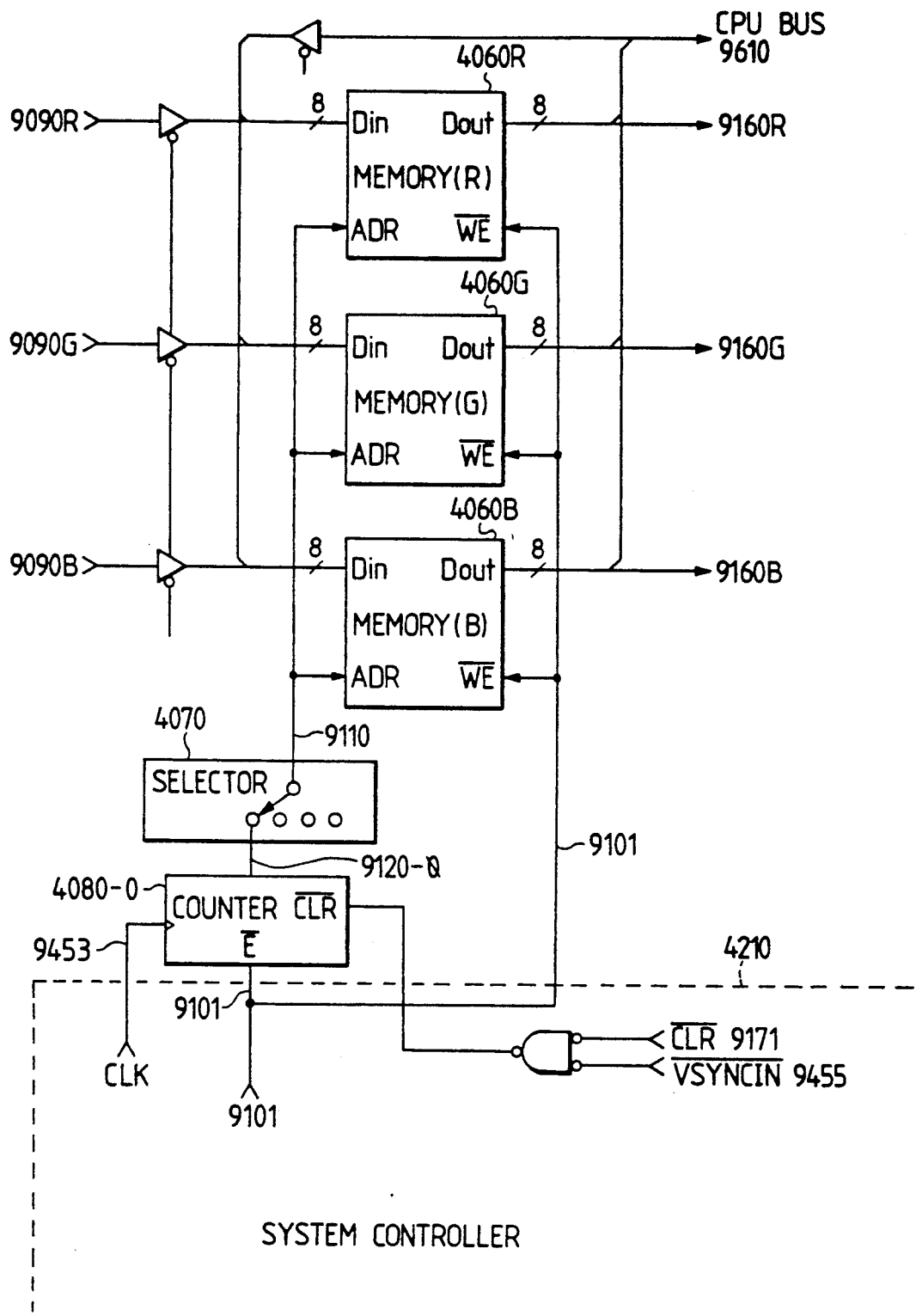
FIG. 15 is a circuit diagram of the system controller and the image memory in the image memory apparatus of said embodiment.

In the present embodiment, since the amount of read image data is larger than the capacity of image memories, the storage in the image memories is conducted after reduction of said image data to a storable amount. However, if the amount of read image data is less than the capacity of image memories, it is possible to store plural images simultaneously in the image meories by shifting the CLR signal 9171, shown in FIG. 15, to "1". In such case, the trimming data are set in the comparators 4232, 4233 controlling the data storage of the area designated by the digitizer 16, and the same-size process is set in the rate multiplier 4234. Also the data set in the RAM 4212 are all "0" in the effective image area but "1" otherwise, corresponding to the same-size process.

Also in order to achieve data storage with the original aspect (vertical-to-horizontal) ratio of the image, the CPU 4360 determines the effective number "x" of pixels, from the area information set form the digitizer 16, and calculates a value "z" from the maximum capacity "y" of the image memories, according to the following equation:

$$y/x \times 100 = z$$

Then:

(1) if $z \geq 100$, the image data are stored in the same size, by setting the rate multiplier 4234 at 100% and setting "0" in all the effective image area in the RAM 4212; or (2) if $z < 100$, the image data are stored in the maximum capacity of the memory, with the original aspect ratio, by setting a reduction of z % in the rate multiplier 4234 and the RAM 4212.

In the latter case, data "1" and "0" are suitably set in the RAM 4212 according to the reduction ratio "z".

Such control enables an arbitrary change of image magnification with the original aspect ratio, through an easy process within the image memory apparatus 3, and allows maximum utilization of the memory capacity.

SV record/regenerating interface

The system of the present embodiment is also capable, as shown in FIG. 1, of storing a video image from the SV record/regenerating unit 31 in the image memory apparatus 3, and sending said image to the monitor television 32 or the color printer 2. The image memory apparatus 3 is also capable of handling the entered image.

In the following there will be explained the fetching of the video image from the SV record/regenerating unit 31 into the image memory apparatus 3.

At first reference is made to block diagrams of the image memory apparatus 3 shown in FIGS. 10A and 10B, for explaining the fetching control of the video image from the unit 31 to the image memory apparatus 3.

The video image from the SV record/regenerating unit 31 is entered through an analog interface 4500 in the form of NTSC composite signal 9000, and is separated, by a decoder 4000, into four signals 9015R, G, B, S which are respectively composite R, G, B signals and composite SYNC signal.

The decocer 4000 also decodes the Y (luminance)/C (chroma) signal 9010 from the analog interface 4510. A selector 4010 receives the separator R, G, B signals and composite SYNC signal (9020R, 9020G, 9020B, 9020S). A switch 4530 controls the selector 4010 for selecting either the signals 9030R - S or 9015R - S, respectivley when the switch 4530 is open or closed.

The separate R, G, B signal 9050R, G, B selected by teh selector 4010 are subjected to A/D conversion by A/D converters 4020R, 4020G, 4020B.

The selected composite SYNC signal 9050B, is supplied to a TBC/HV separating circuit 4030 which generates a clock signal 9060C, a horizontal synchronization signal 9060H and a vertical synchronization signal 9060V. These synchronization signals are supplied to the system controller 4210.

The clock signal TVCLK 9060C supplied from the TBC/HV separating circuit 4030 of the present embodiment has a frequency of 12.25 MHz. Also the synchronization signal TVHSYNC 9060H has a pulse duration of 63.5 μsec, and the synchronization signal TVVSYNC 9060V has a pulse duration of 16.7 msec.

FIFO memories 4050R, G, B are reset by the synchronization signal 9060H, and respectively store the data 9060R, G, B in synchronization with the TVCLK signal 9060C starting from the address "0". The data storage of said FIFO memories 4050R, G, B is conducted while the WE signal 9100 is activated by the system controller 4210.

In the following there will be explained the details of writing control of said FIFO memories 4050R, G, B by said WE signal 9100.

The SV record/regenerating unit 31 in the present embodiment is based on the NTSC standard. Consequently, when the video image from the unit 31 is digitized, there is required a capacity of 640 (H) × 480 (V) pixels. Consequently the CPU 4360 of the image memory apparatus 3 sets the comparators 4232, 4233 so as to obtain 640 pixels in the main scanning direction. Then the CPU 4610 is selected by the selector 4213 to store data "0" of 480 pixels in the RAM 4212.

Also data for 100% are set in the rate multiplier 4234 for setting the image magnification in the main scanning direction.

In case of storing the image information from the SV record/regenerating unit 31 in the memories 4060R, G, B, the system controller 4210 supplies the signals TVVSYNC 9060V, TVHSYNC 9060V, TVHSYNC 9060H, TVCLK 9060C, released from the TBC/HV separating circuit 4030, to signal lines VSYNCIN 9455, HSYNCIN 9452 and CLKIN 9456 shown in FIG. 12.

As explained in the foregoing, the image control signal is taken from the SV record/regenerating interface, whereby the data of a main scanning line of the output signals 9060R, G, B from the A/D converters 4020R, G, B are stored in same size in the FIFO memories 4050R, G, B.

On the other hand, in case of storing the input video image in reduced form in the FIFO memories 4050R, G, B, a reduction ratio is set in the rate multiplier 4234, and data "1" are suitably set in the RAM 4212 according to the reduction rate.

The data transfer from the FIFO memories 4050R, G, B to 4060R, G, B is conducted in a similar manner as in the above-explained data writing control from the color image reader 1 to the memories 4060R, G, B.

The SV record/regenerating unit 31 of the present embodiment is of the NTSC standard, so that the aspect ratio of the digital image is assumed to be 4:3. However it is also possible to accommodate the future high definition television standard HDTV with an aspect ratio 16:9, by suitably modifying the data of the comparators 4232, 4233 and the RAM 4212.

Figure 24C:
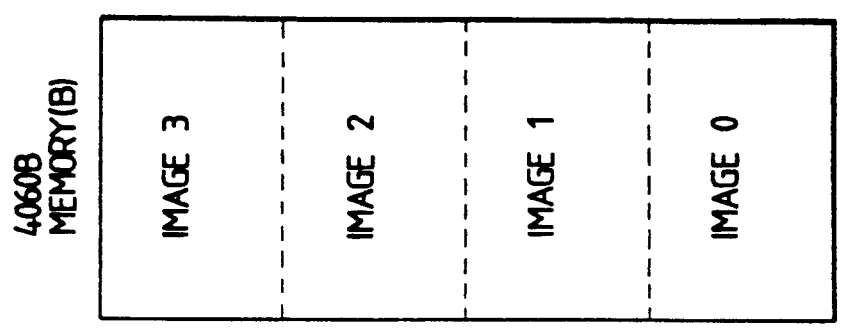
Figure 24B:
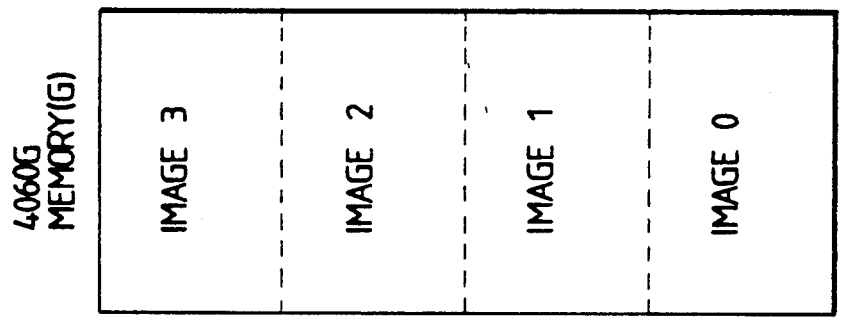
Figure 24A:
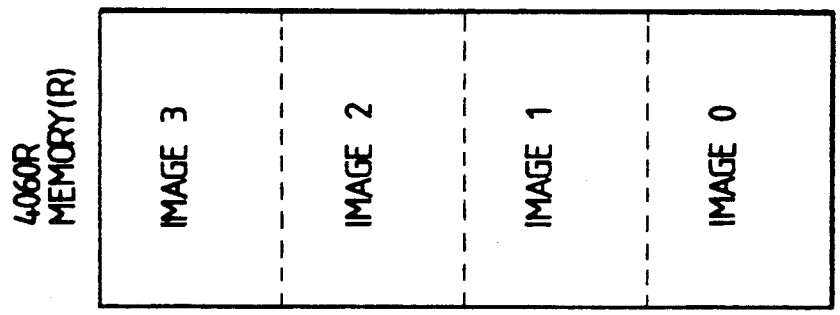

The memory capacity of the present embodiment is 1.25M bytes, whereas the data amount of a frame in the NTSC standard is about 0.3M bytes, so that there can be stored images of four frames. The normal arrangement of said four frames is shown in FIGS. 24A-C.

Write control when memory units are increased

In the following there will be explained the control method for fetching, from the color image reader 1, an image larger than a memory unit (1.25 Mbytes), with reference to FIG. 10.

The input image data are written into the FIFO memories 4050R, G, B of each of the memory units A, B, C, D as explained above. (Hereinafter the memories A, B, C, D are identified by suffixes -A, -B, -C, -D attached to each signal shown in FIG. 10C.

Let us consider a case of storing an image in four memories A, B, C, D. If said image is of a size of m×n lines, an image of m×n/4 lines is stored in each of the memories A, B, C, D. For achieving such control, the signal lines 9101-A, 9102-A and 9140-A shown in FIG. 10A are controlled by the system controller 4210 until the image data of n/4 lines are fetched in the memory A. When the memory A is filled by the image data of n/4 lines, the control by the system controller 4210 shifts to the signal lines 9101-B, 9102-B, 9140-B.

As each memory is filled with the data of n/4 lines thereafter, the control of the system controller 4210 shifts from the memory B to C, and then to D. Thus the added memories can be regarded as a single memory of a larger capacity. FIGS. 25A-L show the content of the memories in this case, wherein x/16 (x being an integer from 1 to 16) indicates the sequential number of 16-divided fractional images.

As an extention of such memory control, 16 images are fetched in four memories as shown in FIG. 26. If the images 1, 2, 6, 7, 8, 11, 12, 13 and 14 are not desirable, it is possible to erase these images and to newly fetch an image 1 of two blocks and an image 6 of seven blocks, thereby storing 9 images in total.

Fetching of C, M, Y, Bk images from the color image reader 1

In the following there will be explained a method of placing originals separated in cyan, magenta, yellow and black in succession on the original support table of the color image reader 1 and scanning these originals every time thereby fetching four-colored images in succession.

Figure 5:
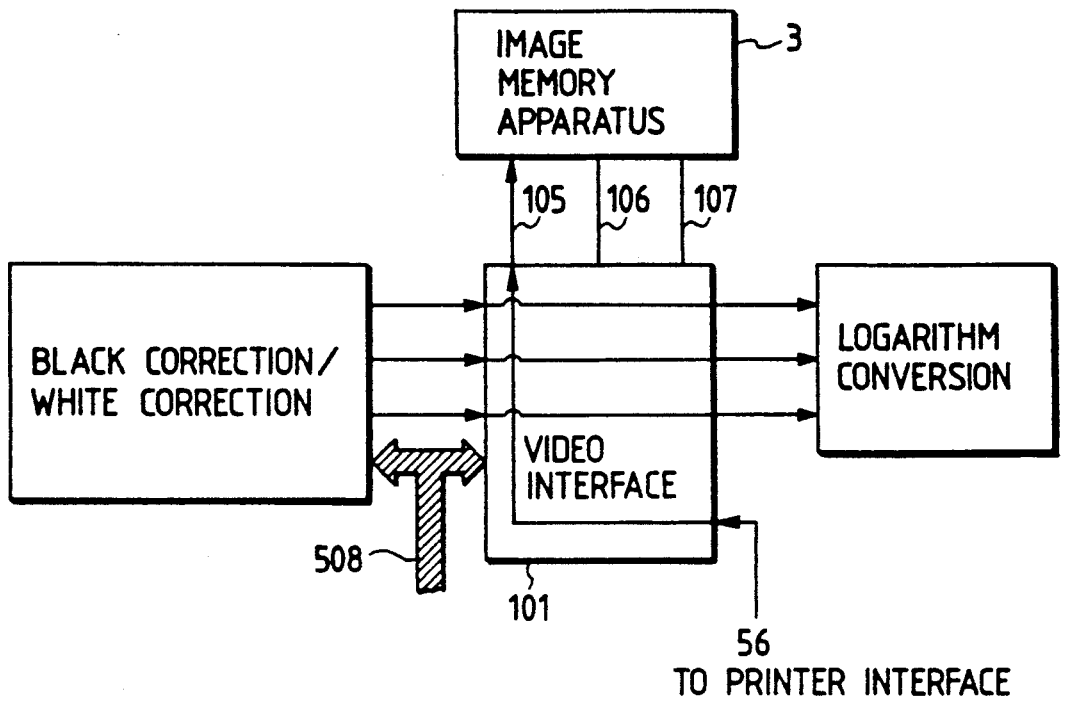
Figure 6:
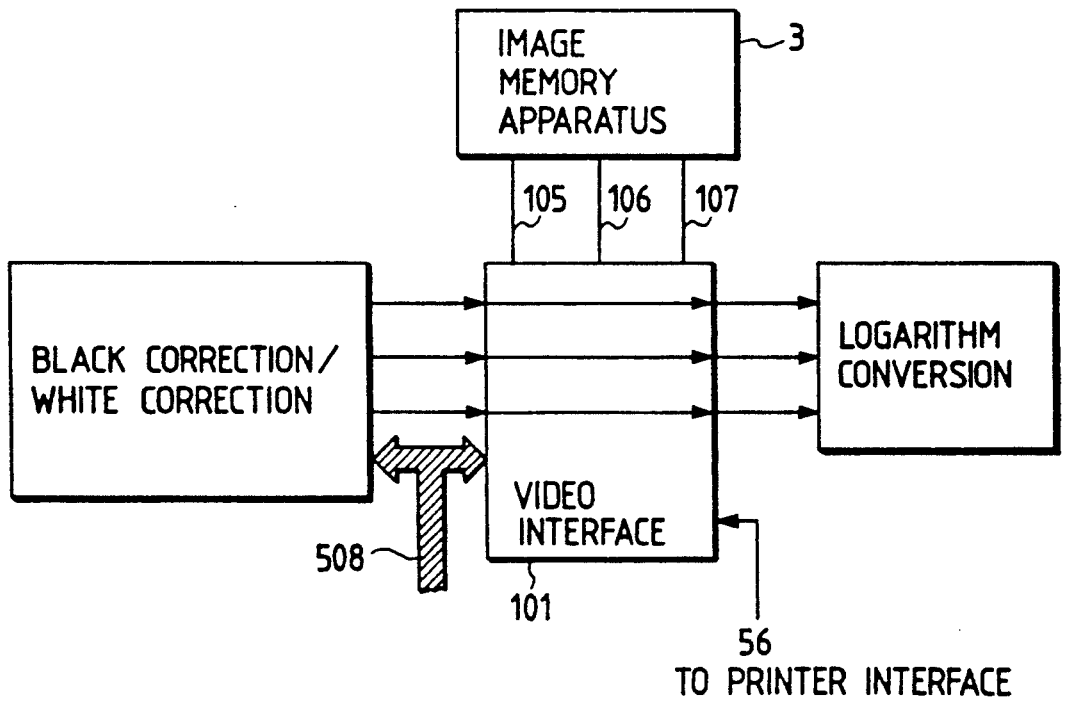

At first, in the color image reader shown in FIG. 2, the read digital image information is subjected to the black and white level corrections, then is transmitted by the video interface 101 as shown in FIG. 5 and sent to the subsequent image processing circuits. However the color correction and masking circuits 48 merely effect weighting, and the gamma correction, image magnification change and filtering circuits merely transmit said information which therefore reaches the printer interface 56. Said information is then supplied, through the video interface 101, to the image memory apparatus 3. Thus the image data of C, M, Y or Bk are supplied to the image data bus normally used for red, connected to the video interface 101. Other processes are same as explained before, and will not therefore be explained further.

The signal C, M, Y or Bk supplied to the image memory apparatus 3 through the R data bus enters, by the selector 4250 shown in FIG. 10B, all the signal lines 9420R, G, B. The selecting method in this case will be explained with reference to FIG. 11. There are made signal settings SELECT-A (9451-A) at "0", SELECT-B (9451-B) at "1", SELECT-C (9451-C) at "1", SELECT-D (9451-D) at "0", SELECT E (9451-E) at "1" and SELECT-F (9451-F) at "1", whereby the signal supplied through 9430R is released through 4251R to 9420R, and the signal transmitted through 4251R is released through 4256G to 9420G and through 4256B to 9420B.

Now reference is made to FIGS. 28A-L for explaining the mode of arrangement of C, M, Y, Bk in the memory. The data C, M and Y are respectively stored in ¾ of the memories normally used for R, G and B, and the data Bk are stored, by ¼ each, in the remaining ¼ portions of said memories.

The writing control is different from that for the data R, G, B in that the data C, M, Y and Bk are entered in succession, since the originals of different colors are placed in succession, whereas the data R, G and B are normally entered in parallel manner.

Figure 10C:
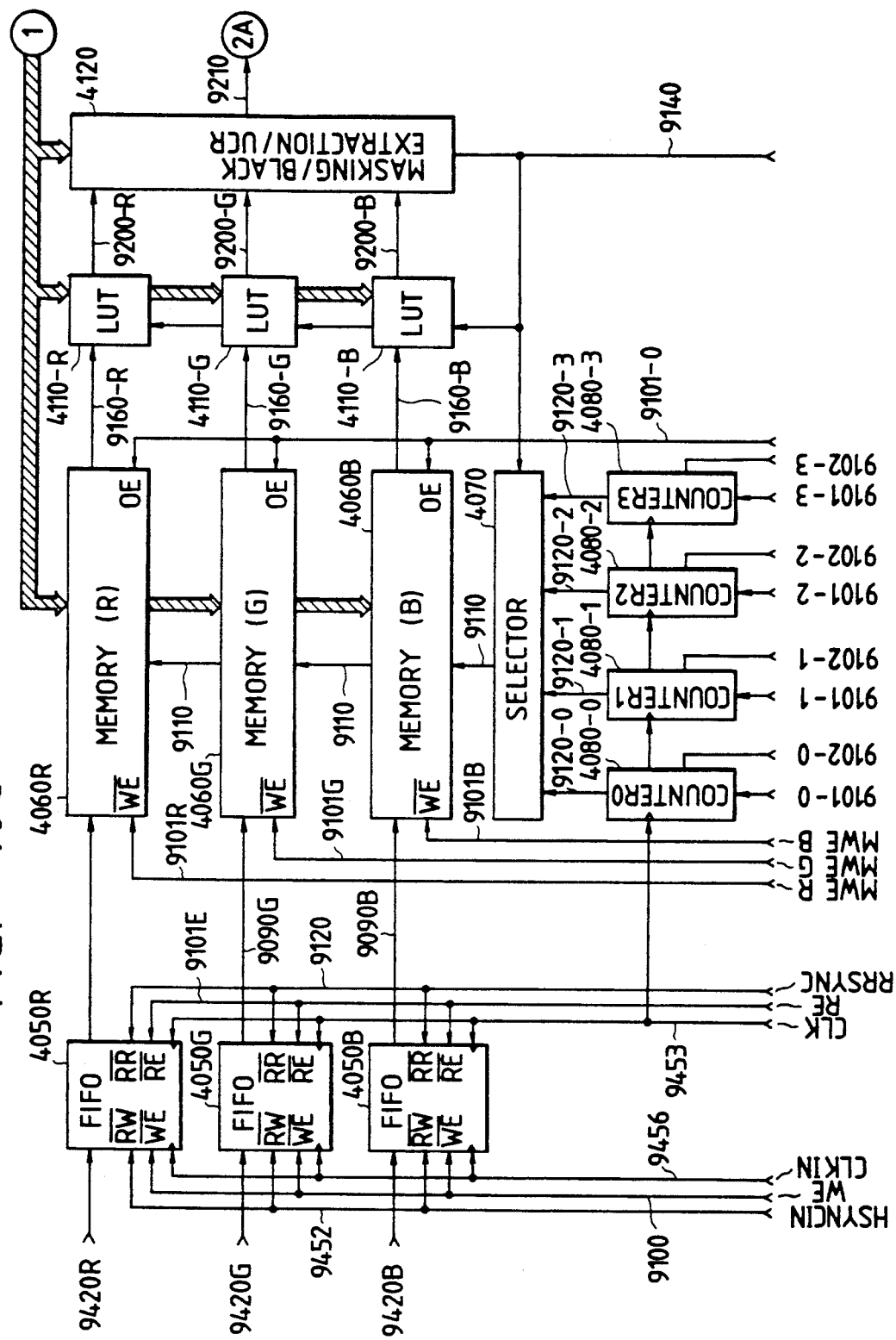

For this reason, the control of memory write enable signals 9101R, G, B shown in FIG. 10C is changed from the case of fetching the data R, G, B. More specifically, for writing the data C, the signals 9101R, G, B are respectively set at "0", "1", "1". For writing the data M, said signals are set at "1", "0", "1". For writing the data Y, said signals are set at "1", "1", "0". Other controls are same as in the ordinary case. In the present embodiment, the memories A, B among four memories A-D are used for storing a frame. More specifically, a half of the data of the frame is stored in the memory A, while the other hand is stored in the memory B.

Figure 29:
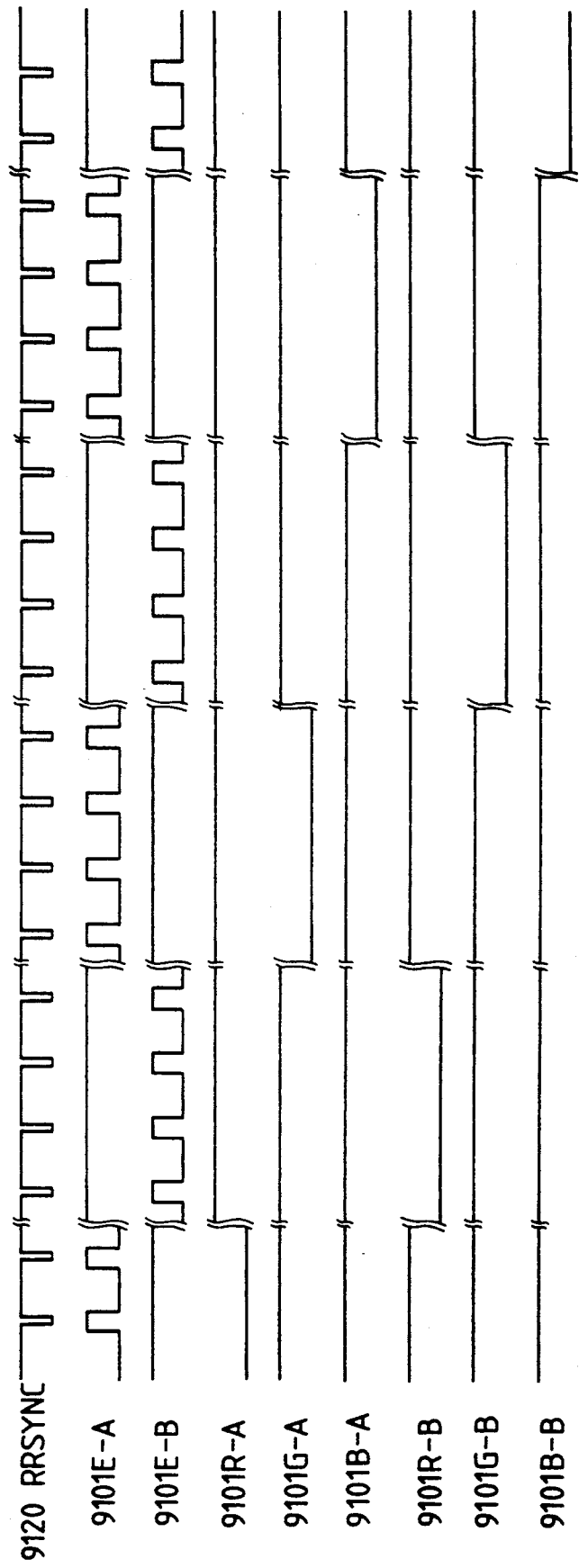
FIG. 29 is a timing chart showing storage of black data into the memory shown in FIG. 20.

Now reference is made to FIG. 29 for explaining the timing of control signals in storing the data Bk in the memories A, B. At first, as shown in FIG. 29, the data of the FIFO memory 4050R of the memory A are read, and are stored in an area Bk1 shown in FIGS. A-L, since the signal 9101R is "0". When the area Bk1 is filled up, the control of the system controller 4210 shifts to the memory B, and the data are stored in an area Bk2 since the signal 9101R-B is "0". At the same time the counter 0 of the memory A (9101-0-A) is reset to return to the leading address of the 4th block of the memory A. When the block Bk2 becomes full, the data storage takes place in a block Bk3. Thereafter the control alternates between the memories A and B, and the data Bk are stored in the order of blocks Bk1 to Bk6 shown in FIGS. 28A-L.

Data readout from the image memory apparatus

In the following explained is the readout of image data from the memories 4060R, 4060G, 4060B of the image memory apparatus 3.

In case of image formation on the color printer 2 based on the output from said memories, the instructions are mainly given from the digitizer 16 shown in FIG. 7.

In FIG. 7, an entry key 428 is used for instructing an image formation according to the size of the recording sheet on the color printer 2, based on the image data from the memories 4060R, G, B. Another entry key 429 is used for forming an image at a position designated by the coordinate detection board 420 and the pointer pen 421 of the digitizer 16.

In the following there will be explained a mode of image formation according to the size of recording sheet, and then a mode of image formation in an area designated by the digitizer.

Image formation according to the size of sheet

In the present embodiment, the color printer 2 is equipped with two cassette trays 735, 736 for housing two different recording sheets, as shown in FIG. 1. Sheets of A4 size and A3 size are respectively stored in the upper and lower trays, and can be selected by a liquid crystal touch panel of the operation unit 20. In the following there is explained a case of forming plural images on an A4-sized recording sheet.

Prior to the image formation, the read image data are supplied from the color image reader 1 to the image memory apparatus 3, whereby data of sixteen image "image 0"–"image 15" are stored in the image memories 4060R, 4060G, 4060B for example as shown in FIG. 16.

Figure 17:
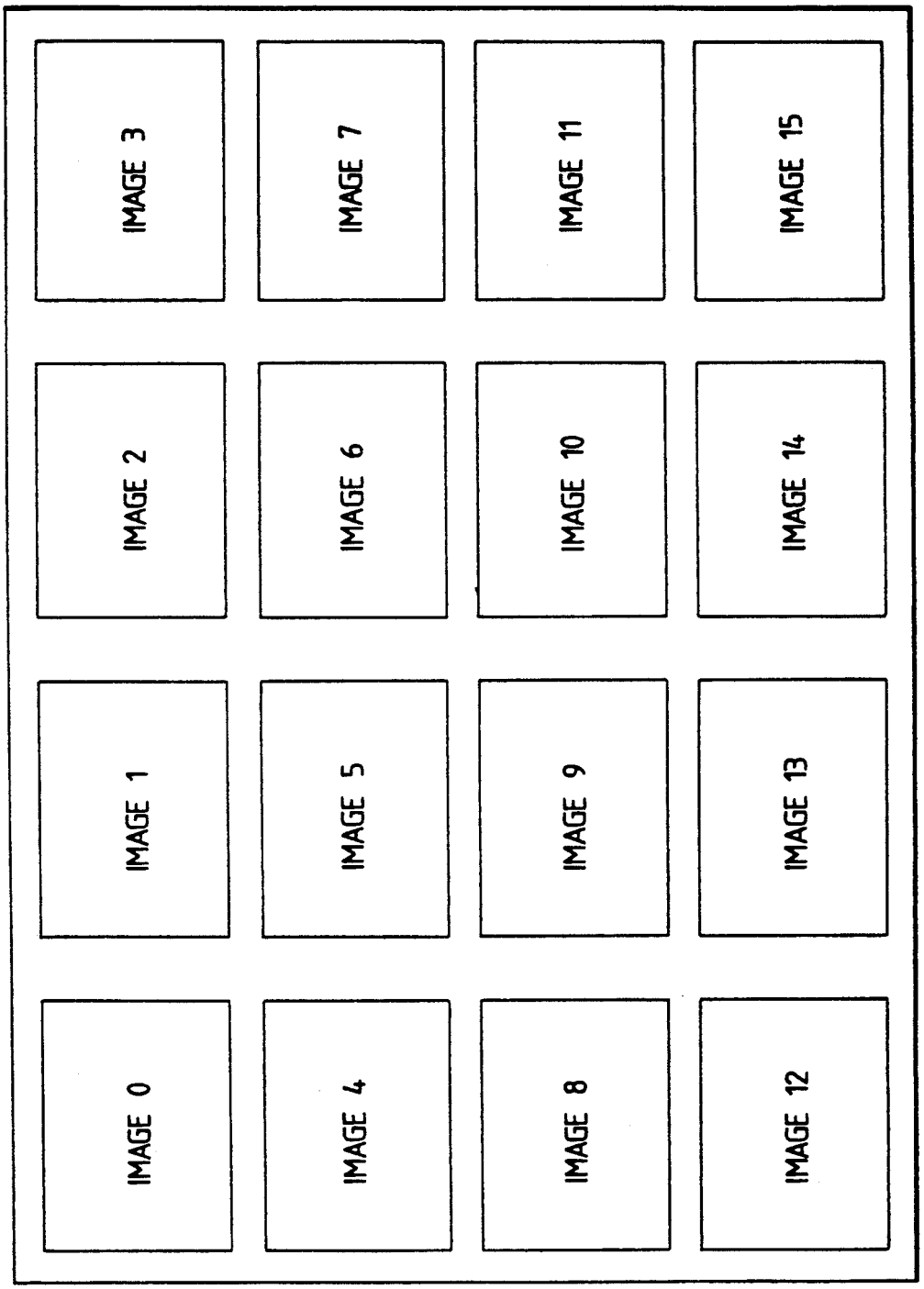
FIG. 17 is a view showing layout of image formation in said embodiment.

Then the entry key 428 of the digitizer is depressed. In response, an unrepresented CPU automatically sets the image forming position on the A4-sized recording sheet. In case of forming sixteen images shown in FIG. 16, the image forming positions are determined, for example, as shown in FIG. 17.

The details of the above-mentioned image forming process will be explained in the following, with reference to a block diagram shown in FIG. 10, and a timing chart shown in FIG. 18.

The ITOP signal 511 sent from the color printer 2 through the printer interface 56 to the color image reader 1 is supplied to the video interface 101 in the video processing unit 12, and further supplied to the image memory apparatus 3, which in response initiates the image forming process. The data of each image supplied to the image memory apparatus 3 are subjected to the image formation, under the control of the system controller 4210 shown in FIGS. 10A, 10B.

Referring to FIGS. 10A nad 10B, the output of the counter 0 (4080-0) is selected by a selector 4070, and access for data readout is made to the memories 4060R, 4060G, 4060B by a memory address line 9110. Image data stored in said memories are read by said access. Readout image signals 9160R, G, B from said memories are sent to look-up tables (LUT) 4110R, G, B for logarithmic conversion for matching the human visual characteristics. The converted data 9200R, G, B from said look-up tables are supplied to a masking/black extraction/UCR circuit 4120, which effects the color correction for the color image signals of the image memory apparatus 3 and also effects undercolor removal and black extraction in case of recording with black color.

The output image signal 9210 from said masking/black extraction/UCR circuit 4120 is separated, by a selector 4130, into different images, which are supplied to FIFO memories 4140-0–4140-3. Thus the sequentially arranged images can be processed in parallel manner by the function of said FIFO memories.

Figure 18:
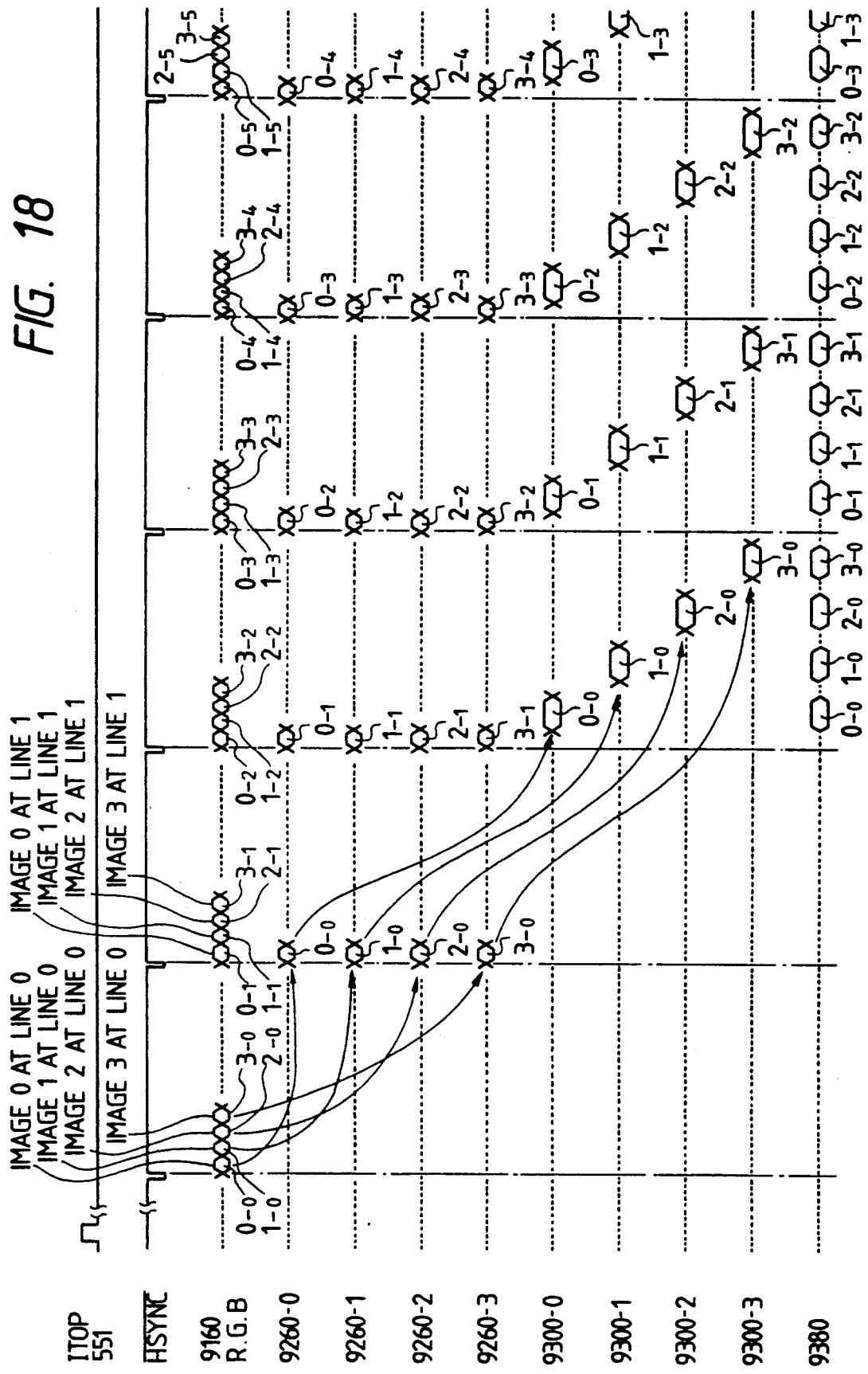
FIG. 18 is a timing chart of image formation processing according to the layout shown in FIG. 17.

The upper part of FIG. 18 indicates the relationship between the image signals 9160R, 9160G, 9160B from the memories and the parallel output image data 9260-0–9260-3 from said FIFO memories. As shown in FIG. 18, the image data 9260-0–9260-3, corresponding to the 0-th line of the "image 0" to "image 3" required in the image formation of a main scanning line, can be processed in parallel manner.

The parallel image signals 9260-0–9260-3 are supplied to enlargement/interpolation circuits 4150-0–4150-3, which are control by the system controller 4210 so as to provide the image layout shown in FIG. 17, and effect enlargement and interpolation as shown by signals 9300-0–9300-3 in FIG. 18. In the present embodiment there is employed first-order interpolation.

The interpolated signals 9300-0–9300-3 are supplied to a selector 4190 for conversion again into serial image data 9330, which is then subjected to edge enhancement and smoothing in an edge filter circuit 4180. Said data are then supplied to a look-up table 4200, and to a selector 4250 through a signal line 9380.

The data supplied to the selector 4250 are transmitted through tristate gates 4256R, G, B, 4255R, G, B and signal lines 9430R, G, B and supplied to a connector 4550.

Similarly signals ENOUT 9454 and CLK 9453 released from the system controller 4210 are supplied, through tristate gates 4256E, V and 4255E, V, to the connector 4550.

In this state, for controlling the tristate gates shown in FIG. 11, control lines SELECT-A (9451A), SELECT-B (9451B) and SELECT-C (9451C) are respectively set at "0", "0" and "1". Also lines SELECT-D (9451D), SELECT-E (9451E) and SELECT-F (9451F) are respectively set at "1", "0" and "0".

After the image formation of all the data of "image 0" to "image 3", image formations are conducted in the order of "images 4–7", "images 8–11" and "images 12–15", whereby 16 images are obtained as shown in FIG. 17.

Image formation by layout at arbitrary position

In the foregoing there has been explained the control for automatically arranging and forming images as shown in FIG. 17. The present embodiment is not limited to such control, but is also capable of forming arbitrary image at arbitrary positions.

In the following there will be explained an example of forming "images 0–3" in a layout shown in FIG. 20.

Figure 19C:
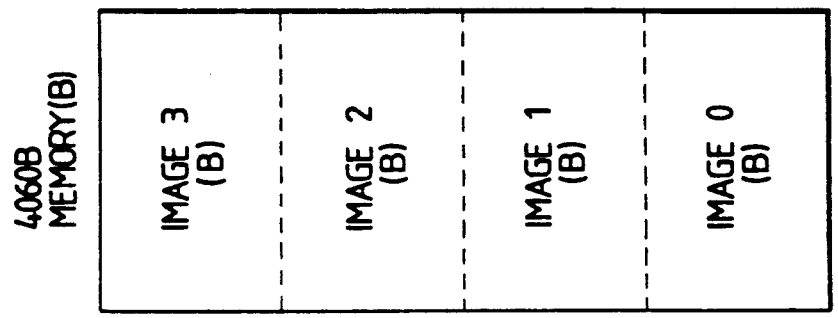
FIG. 19A-C are views showing arrangements of image information in the memory in another embodiment of the image memory apparatus.
Figure 19B:
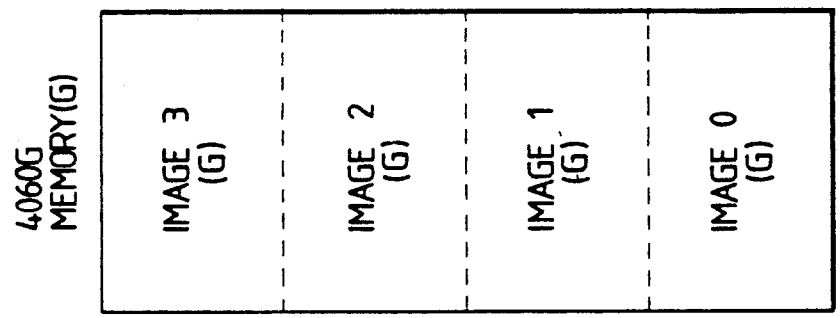
Figure 19A:
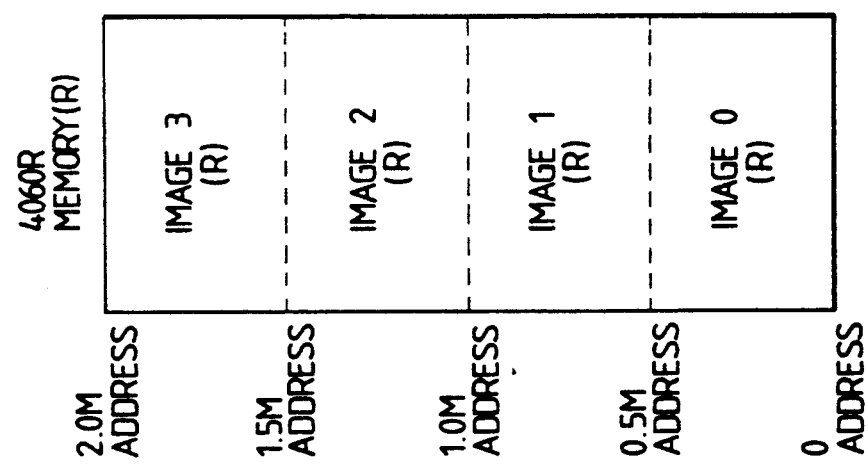

At first, through a control similar to that for image entry to the memories explained before, the image data of four images read in the color image reader 1 are stored in the image memories 4060R, G, B as shown in FIGS. 19A, B and C, respectively. Then the entry key 429 of the digitizer 16 is depressed to await the entry of image forming position from the digitizer 16.

Figure 20:
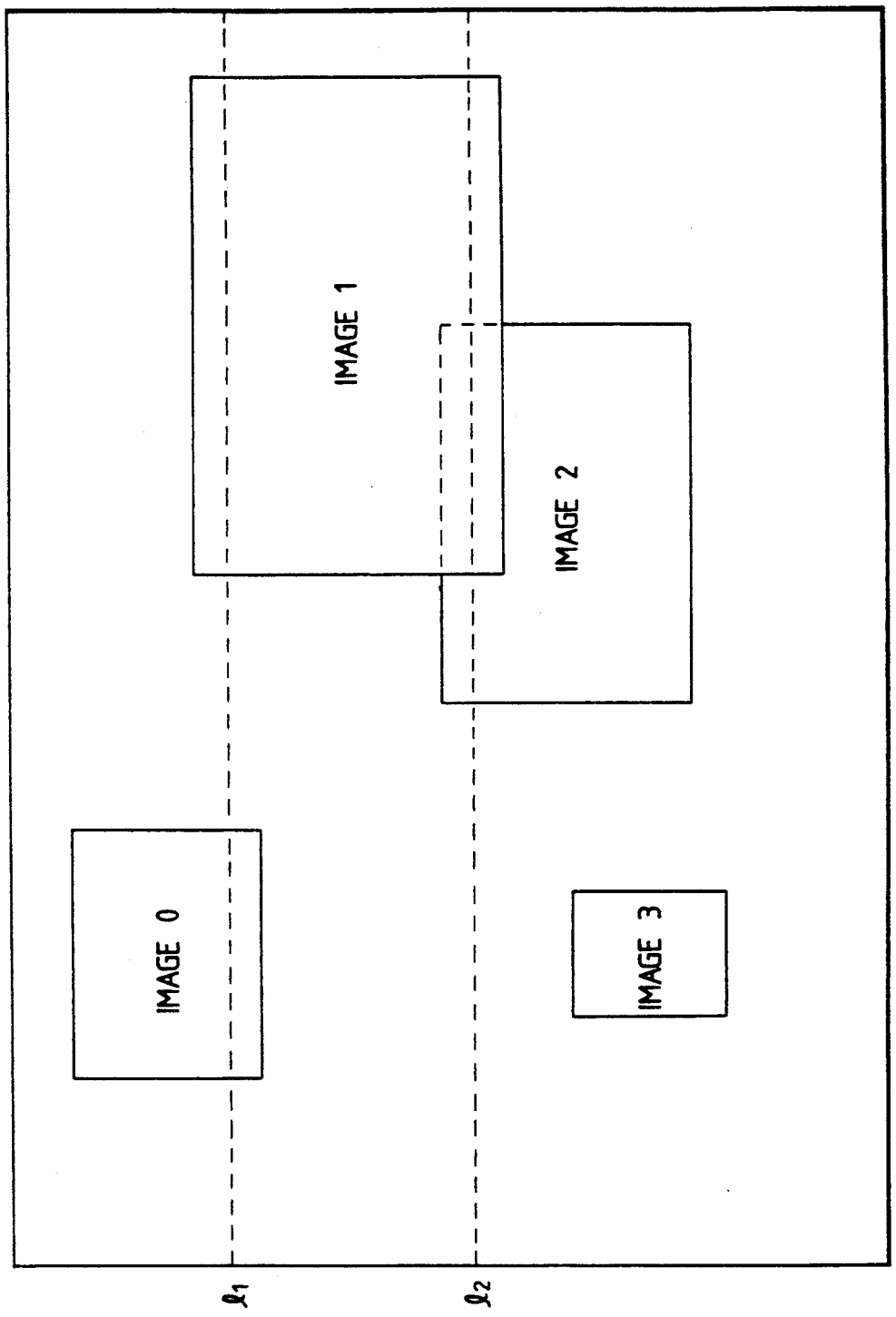
FIG. 20 is a view of an arbitrary layout of the image information shown in FIG. 19.

Then the desired image forming positions are entered, for example as shown in FIG. 20, by means of the pointer pen 421 and the coordinate detection board 420.

The image forming process in this case will be explained in the following, with reference to block diagrams shown in FIGS. 10A and 10B, and timing charts shown in FIGS. 21 and 22.

Figure 21:
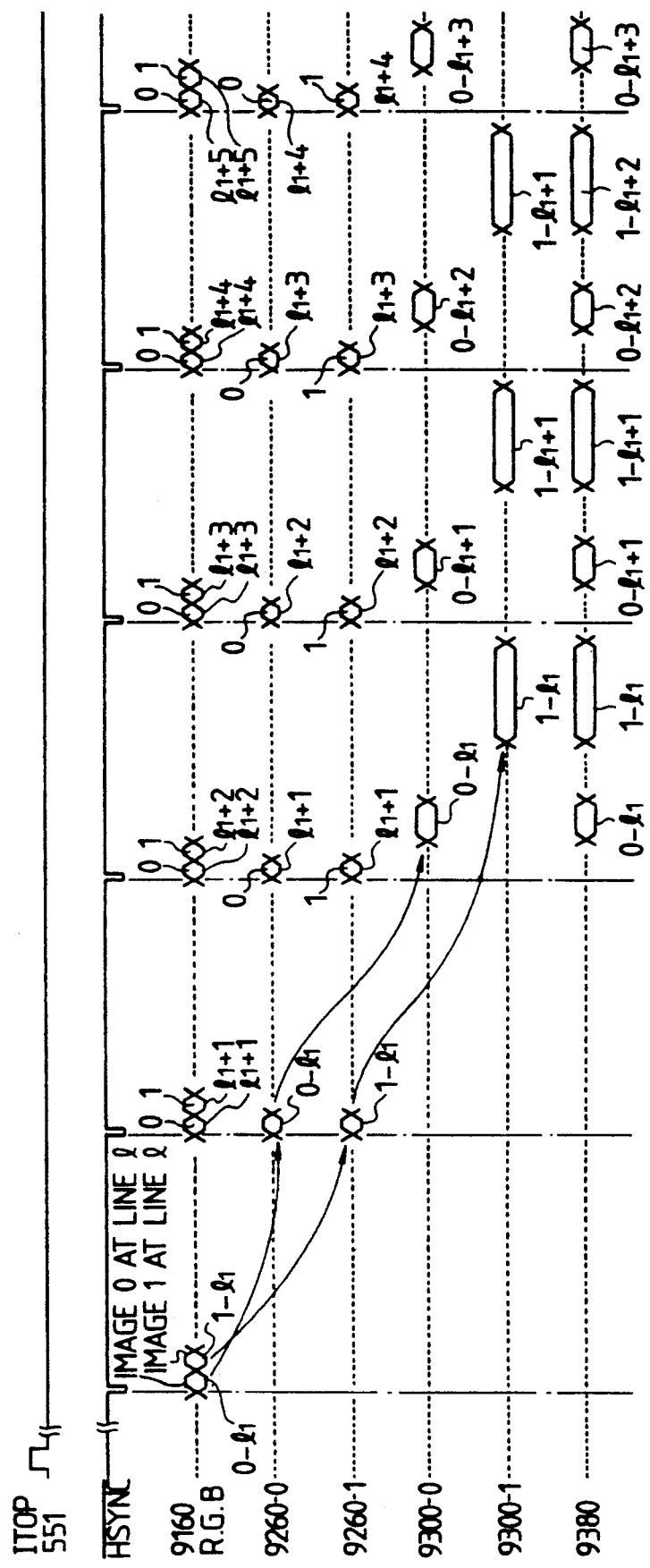
FIG. 21 is a timing chart of image formation in a line $l_1$ shown in FIG. 20.
Figure 22:
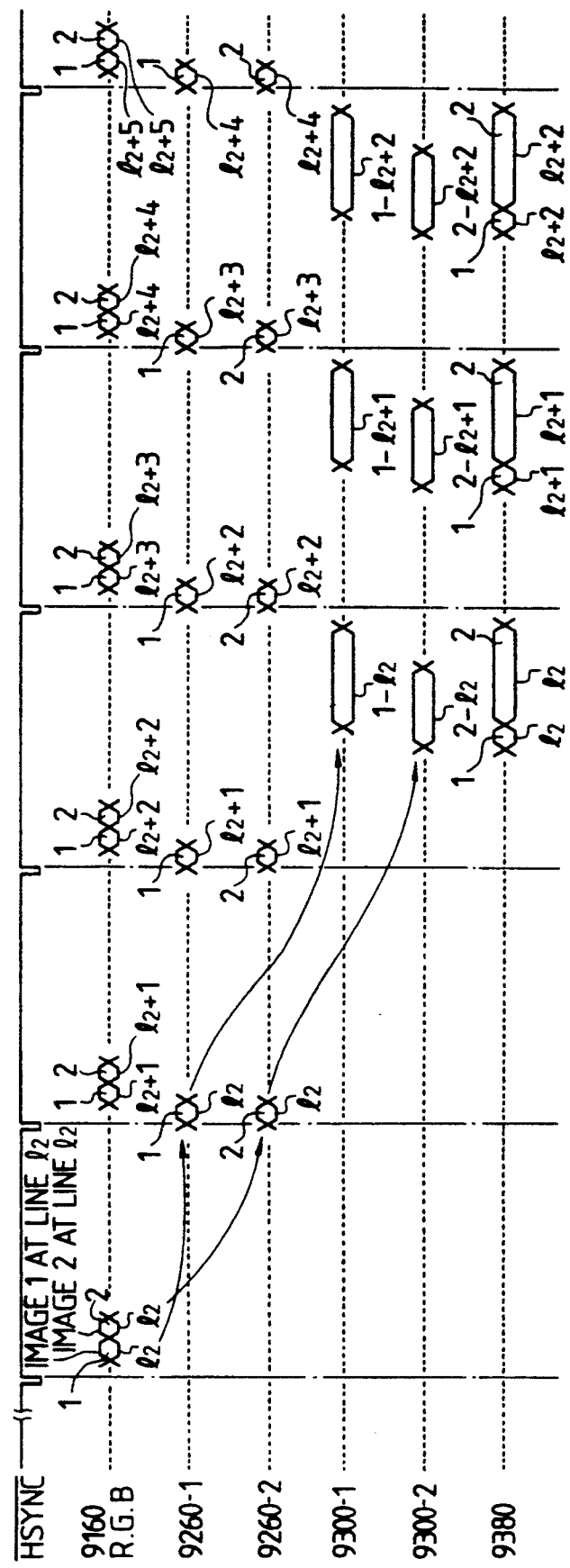
FIG. 22 is a timing chart of image formation in a line $l_2$ shown in FIG. 20.

FIG. 21 is a timing chart at the image formation on a line $l_1$ shown in FIG. 20, and FIG. 22 is a timing chart at the image formation on a line $l_2$.

The ITOP signal 551 is released from the printer 2 as explained before, and the system controller 4210 initiates operation in synchronization with said signal.

In the image layout shown in FIG. 20, the "image 3" is rotated by 90° from that obtained from the color image reader 1.

The rotation of said image is achieved in the following manner. At first the image data are transferred from the memories 4060R, G, B to a work memory 4390, by means of a direct memory access controller (DMAC) 4380. then the image is rotated in the already known manner in said work memory 4390 by means of the CPU 4360, and the image data are transferred from the work memory 4390 to the memories 4060R, G, B by the DMAC 4380.

The position information of the images of which layout is designated by the digitizer 16 is supplied, through the video processing unit 12 shown in FIG. 1, to the image memory apparatus 3. In response the system controller 4210 generates operation enable signals 9320-0–9320-3 for the enlargement/interpolation circuits 4150-0–4150-3 corresponding to the images.

In the arbitrary positional layout of the present embodiment, counters 0 (4080-0), 1 (4080-1), 2 (4080-2) and 3 (4080-3) function respectively corresponding, for example, to the images 1, 2, 3 and 4.

Now there will be explained the control for image formation on a line $l_1$ in FIG. 20, with reference to FIG. 21.

The "image 0" is read from the image memories 4060R, G, B by the counter 0 (4080-0), from address "0" to "0.5M" (memory area of the image 0 shown in FIG. 19). The switching of the outputs of the counters 4080-0–4080-3 is conducted by a selector 4070.

Similarly the "image 1" is read by the counter 1 (4080-1) from address "0.5M" to "1M" (memory area of the image 1 shown in FIG. 19). The timings of said signal readout are indicated as 9160R, G, B in FIG. 21.

In this case, the counters 4080-2, 4080-3 are not activated by the counter enable signals 9130-2, 9130-3 from the system controller 4210.

The data of the "images 0 and 1" are transmitted through the look-up tables 4110R, G, B to the masking/black extraction/UCR circuit 4120 to obtain frame-sequential color signals 9210. Said signals 9210 are made parallel by the selector 4120, and sent to FIFO memories 4140-0, 4140-1 after division into pixels. When operation enable signals 9320-0, 9320-1 from the system controller 4210 to enlargement/interpolation circuit 4150-0, 4150-1 become active, said circuits activate FIFO readout signals 9280-0, 9280-1 to start the readout control.

In response, the FIFO memories 4140-0, 4140-1 initiate the transfer of image data to the enlargement/interpolation circuits 4150-0, 4150-1, which execute the layout and interpolation according to the areas designated by the digitizer 16. The timings of these operations are indicated as 9300-0, 9300-1 in FIG. 21.

The data of the "images 0 and 1", subjected to the layout and interpolation, are selected by a selector 4190, and supplied to the look-up table 4200 through the edge filter circuit 4180. The subsequent process to the supply to the connector 4550 is same as explained before and will not, therefore, be explained further.

In the following there will be explained the timings for a line $l_2$ shown in FIG. 20, will reference to FIG. 22.

The process from the image memories 4060R, G B to the enlargement/interpolation circuits 4150-1, 4150-2 is substantially same as that explained above.

However, since the "images 1 and 2" are released on said line $l_2$, there are activated the counters 1 (4080-1) and 2 (4080-2), FIFO memories 4140-1, 4140-2, and enlargement/interpolation circuits 4150-1, 4150-2 according to the control signals from the system controller 4210.

As shown in FIG. 20, the "images 1 and 2" partly overlap on the line $l_2$. It is possible to select, by a control signal 9340 from the system controller 4210, to form either image or to form both images in the overlapping portion.

The specific control is executed as explained above.

The signals from the connector 4550 are supplied, by a cable, to the color image reader 1. Thus, the video interface 101 of the color image reader 1 selectively sends the image signals 105 from the image memory apparatus 3 to the printer interface 56, through the signal lines shown in FIG. 5.

In the following there will be explained the details of transfer of image data from the image memory apparatus 3 to the color printer 2 in the image formation of the present embodiment, with reference to the timing chart shown in FIG. 23.

In response to the depression of a start button in the operation unit 20, the printer 2 is activated and initiates the feeding of a recording sheet. When the recording sheet reaches the front end of image forming area, there is generated the ITOP signal 551, which is sent to the image memory apparatus 3 through the color image reader 1. The image memory apparatus 3 reads the image data from the image memories 4060R, G, B under the designated conditions, executes the processes of layout, enlargement, interpolation etc. as explained above, and sends the processed image data to the video processing unti 12 of the color image reader 1. The video interface 101 of the video processing unit 12 varies the processing method therein, according to the nature of the transmitted data ((R, G, B) or (M, C, Y, Bk)).

In the present embodiment, since the output is given in frame-sequential manner by M, C, Y and Bk, the image is completed by repeating the above-explained operation four times in the order of M, C, Y and Bk.

Printer unit

Now reference is made to FIG. 1 for explaining the structure of the color printer 2 for printing the image signals processed in the video processing unit 12.

Referring to FIG. 1, a scanner 711 is provided with a laser unit for converting the image signals from the color image reader 1 into optical signals, a polygon mirror 712 for example of octahedron, a motor (not shown) for rotating said polygon mirror, an f/$\theta$ lens (imaging lens) 713 etc. There are also provided a mirror 714 for deflecting the path of laser beam from the scanner 711, and a photosensitive drum 715.

The laser beam emitted from the laser unit is reflected by the polygon mirror 712 and linearly scans the photosensitive drum 715 by means of the f/$\theta$ lens 713 and the mirror 714, thereby forming a latent image corresponding to the original image.

Around the photosensitive drum 715 there are provided a primary charger 717, a flush exposure lamp 718, a cleaner unit 723 for recovering the remaining toner, and a pre-transfer charger 724. A developing unit 726, for developing the electrostatic latent image formed on the photosensitive drum 715, includes developing sleeves 731Y (yellow), 731M (magenta), 731C (cyan), 731Bk (black) for image development in contact with the photosensitive drum 715, toner hoppers 730Y, 730M, 730C, 730Bk for holding the toner, and screws 732 for transferring the toner. Said sleeves 731Y, 731Bk, toner hoppers 730Y–730Bk and screws 732 constitute the developing unit 726, and are arranged around a rotary shaft P of the unit 726.

For forming a yellow image, the development is conducted with the yellow toner in the position illustrated in FIG. 1. For forming a magenta image, the developing unit 726 is rotated about the shaft P so as to bring the magenta developing sleeve 731M to a position in contact with the photosensitive drum 715. The development with cyan or black toner is also similarly conducted by rotating the developing unit 726 about the shaft P.

There is provided a transfer drum 716 for transferring the toner image, formed on the photosensitive drum 715, onto the recording sheet. Around said transfer drum 716, there are provided an actuator plate 719 for detecting the position of the transfer drum 716, a position sensor 720 for detecting the home position of the transfer drum 716 when said actuator plate 719 comes close, a transfer drum cleaner 725, a sheet pressure roller 727, a charge eliminator 728, and a transfer charger 729.

There are further provided sheet cassettes 735, 736 for storing recording sheets, sheet feeding rollers 737, 738 for feeding sheet from the cassettes 735, 736, and timing rollers 739, 740, 741 for regulating the timing of sheet feeding and transportation. The recording sheet fed by these components is guided by a sheet guide 749, the wound on the transfer drum 716, with the leading and being held by a gripper to be explained later, and enters the image forming process.

A drum motor 550 rotates the photosensitive drum 715 and the transfer drum 716 in synchronization. There are also shown a separating finger 750 for separating the recording sheet from the transfer drum 716 after the image forming process, a conveyor belt 742 for transporting the separated recording sheet, and an image fixing unit 743 for fixing the image of the recording sheet transported by the conveyor belt 742. In said image fixing unit 743, the rotation of a motor 747 mounted on a motor mounting unit 748 is transmitted, through gears 746, to a pair of heat pressure rollers 744, 745, for fixing the image on the sheet passing between said rollers.

In the following there will be explained the printout process of the above-explained printer 2, with reference to a timing chart shown in FIG. 23.

At first, in response to a first ITOP signal 551, a latent image corresponding to yellow color (Y) is formed on the photosensitive drum 715 by the laser beam, then developed with the developing unit 731Y and is transferred onto the sheet on the transfer drum to obtain the yellow print. Then the developing unit 726 is rotated about the shaft P.

Then, in response to a next ITOP signal 551, a latent image corresponding to magenta color (M) is formed on the photosensitive drum by the laser beam, thus obtaining the magenta print in a similar manner. This procedure is repeated for the succeeding ITO signals 551 for cyan and black to obtain the cyan and black prints. After the image forming process is completed in this manner, the sheet is separated by the separating finger 750 and is fixed in the image fixing unit 743. Thus a cycle of color image printing is completed.

Readout of image data of a frame stored in four memories

In the following there will be explained the method of reading image data stored in the memories as shown in FIGS. 25A-L. In this example each memory is divided into four blocks, but since the images are recorded in sequential order, the readout of the image can be achieved by merely counting up the counter 0 (4080-0) shown in FIG. 10C. In the following explained is the method of data reading at the boundary of memories, with reference to FIG. 10.

In the example shown in FIG. 25, when the last line of the image (image data of 1/16, 2/16, 3/16, 4/16 of components R, G, B of the image) of the memory A is read, the system controller 4210 varies the selection signal to 9250-0 of the selector 4130 from [2A] (9210B) to [2B] (9210B) in synchronization with the HSYNCIN signal 9452. Also at the same time the memory readout control (9101-A) for the memory A is terminated, and the memory readout control (9101-B) for the memory B is started. Through such control, the data of the last line of the memory A are properly connected to those of the first line of the memory B.

Readout of data C, M, Y, Bk from the image memory apparatus 3

In the following there will be explained the method of readout of data C, M, Y, Bk stored in the arrangement shown in FIGS. 28A-L. The readout of the data C, M, Y is the same as that of ordinary data R, G, B. However, after the data C, M, Y are read in parallel manner from the memories 4060R, G, B, they are supplied to look-up tables 4110R, G, B and the masking/black extraction/UCR circuit 4120 so as to multiply said data R, G, B by suitable coefficients in order to match the characteristics of color separation with the color characteristics of the color printer 2, thereby obtaining corrected data C', M', Y' (9210). The subsequent process is same as that in the aforementioned readout from the image memory apparatus.

The image data Bk can be read by alternating the addresses of data Bk in the memories A and B. In this case the masking/black extraction/UCR circuit 4210 is not used for the functions of masking/black extraction/UCR but is merely utilized as a selector. Also the system controller 4210 controls in such a manner that the data of 9210A, 9210B shown in FIG. 10A are selected by the selector 4130 shown in FIG. 10B, then transmitted by the enlargement/interpolation circuit 4150 and the selector 4190 shown in FIG. 10B and released in the order of Bk1-Bk6 as the output signal 9330 of the selector 4190. Consequently, in the present embodiment, it is possible to predict the state of actual printed image from the separated images Y, M, C, Bk, since said separated images Y, M, C, Bk are stored in the memories and then are read therefrom in succession.

Monitor television interface

In the system of the present embodiment, as shown in FIG. 1, the content of the image memories of the image memory apparatus can be displayed on the monitor television 32. Also the video image from the SV record/regenerating unit 31 can be displayed.

More specifically, the video image data stored in the image memories 4060R, G, B are read by the DMAC 4380 and transferred to display memories 4410R, G, B.

The video image data stored in said display memories 4410R, G, B are supplied, through lookup tables 4420R, G, B, to D/A converters 4430R, G, B for conversion into analog signals 4590R, G, B in synchronization with the SYNC signal 4590S from the display controller 4440.

On the other hand, said display controller 4440 releases a SYNC signal 9600 in synchronization with the output timing of said analog signals. The memory content of the image memory apparatus 3 can displayed on the monitor 4, by connecting said analog signals 4590R, G, B and the SYNC signal 4590S to said monitor.

Also in the present embodiment, the displayed image can be trimmed by sending a control command from the host computer 33 to the image memory apparatus 3.

The CPU 4360 can achieve said trimming, by sending the effective image area only from the display memories 4410R, G, B to the image memories 4060R, G, B in a similar manner as explained before, according to the area information entered from the host computer 33.

Also the trimmed image data can be stored in the image memories 4060R, G, B by setting suitable data in the comparators 4232, 4233 and RAM 4212 shown in FIG. 12 according to the area information from the host computer 33 and entering the image data again from the color image reader 1 or the SV record/regenerating unit 31.

A variable resistor 4400 is provided for regulating the color of the image displayed on the monitor television 32. The CPU 4360 reads the resistance of said variable resistor 4400, and sets correction data in the look-up tables 4420R, G, B according to said resistance. Also in order to match the color recorded by the color printer 2 with that displayed on the monitor 4, the correction data of the look-up table 4200 are varied as the function of the resistance of the variable resistor 4400.

Also, in case plural images are stored in the image memories 4060R, G, B, the layout of the images to be printed by the color printer 2 can be made by the monitor television 32 and the host computer 33.

Such image layout to be printed with the color printer 2 can be achieved by displaying the size of the recording sheet on the monitor television 32 and entering the layout position information of the images through the host computer 33, while watching the display.

The data readout control from the image memories 4060R, G, B to the color printer 2, and the recording control in the color printer 2 are same as those in the foregoing embodiment and will not, therefore, be explained further.

Computer interface

In the system of the present embodiment, as shown in FIG. 1, there is provided a host computer 33 which is connected with the image memory apparatus 3. In the following explained is the interface with said host computer, with reference to FIG. 10.

The interfacing with the host computer 33 is conducted by a GPIB controller 4310 connected by the connector 4580. Said GPIB controller is connected to the CPU 4360 through the CPU bus 9610, and is capable of command exchange and image data transfer with the host computer 33 through a predetermined protocol.

As explained in the foregoing, the present embodiment allows to divide the memory into plural blocks and to vary the size of divided blocks thereby enabling efficient utilization of memories, by controlling the start address of a memory address counter at the data storage into the memory, and utilizing plural address counters at the data readout therefrom.

Also the image memory apparatus of the present embodiment has a wide field of application, such as NTSC television image, color scanner, computer graphics, high definition television etc. due to the variable size of the memory.

Also in the present embodiment, the data C, M, Y can be read in the same manner as the data R, G, B by storing the image data C, M, Y in ¾ of the memory means for R, G, B, and by storing the image data Bk in the remainder of said memory means. Furthermore the difference in characteristics of color separation and those of the printer for printing the image C, M, Y, Bk can be corrected by the processing circuits and look-up tables normally used in the masking, so that the addition of other circuits is unnecessary.

As explained in the foregoing, the present invention can provide an image memory apapratus capable of handling images from various sources.

What is claimed is:

1. An image processing apparatus comprising:

a) reading means for independently reading a plurality of color separation originals, each separation original corresponding to an original of an image having one of a plurality of color components;

b) memory means for storing a plurality of signals, each signal corresponding to one separation original, respectively, read by said reading means; and c) reproduction means for reading the signals stored in said memory means and for combining the signals each corresponding to one of the color separation originals to reproduce a color image corresponding to a combination of the color separation originals.

2. An apparatus according to claim 1, wherein said reading means comprises a reader having a platen glass for supporting an original.

3. An apparatus according to claim 1, wherein said plurality of color components comprise yellow, magenta, cyan and black.

4. An apparatus according to claim 1, wherein said memory means selectively stores a color image signal that is different from said color separation signals of another original and the signals of the color separation originals.

5. An apparatus according to claim 1, where said reproduction means comprises a printer.

6. An apparatus according to claim 1 wherein the separation originals include four separation originals, and said reading means reads the four separation originals independently.

7. An apparatus according to claim 1, wherein said reading means frame-sequentially reads the color separation originals.

8. An apparatus according to claim 1, wherein said reproducing means comprises a printing means.

9. A color image processing apparatus comprising:

a) an image reader for separately reading a plurality of color separation originals, each separation original corresponding to an original of an image having one of a plurality of color components;

b) a memory for storing a plurality of signals, each signal corresponding to one color separation original, respectively, read by said image reader;

c) reading means for frame-sequentially reading out, for each color component, the signals stored in said memory; and d) image forming means for forming an image by combining images each corresponding to one of the signals for each color component read out by said reading means.

10. An apparatus according to claim 9, wherein the plurality of color components are yellow, magenta, cyan and black.

11. An apparatus according to claim 9, where said memory selectively stores a color image signal that is different from said color separation signals of another original and the signals of the color separation originals.

12. An apparatus according to claim 9, wherein said image forming means comprises a frame-sequential printer.

13. An apparatus according to claim 12, wherein said frame-sequential printer comprises an electronic-photo printer.

14. An apparatus according to claim 9, wherein said image forming means combines the signals of the color separation originals stored in said memory for the purpose of color masking processing.

15. An apparatus according to claim 9, wherein said image reader comprises a reader having a platen glass for supporting an original.

* * * * *

UNITED STATES PATENT AND TRADEMARK OFFICE
CERTIFICATE OF CORRECTION

PATENT NO. : 5,260,777

DATED : November 9, 1993

INVENTOR(S) : TAKAYUKI KOMINE, ET AL.

It is certified that error appears in the above-identified patent and that said Letters Patent is hereby corrected as shown below:

COLUMN 1

Line 47, "or" should read --for--.

COLUMN 5

Line 45, "dueing" should read --during--.

COLUMN 7

Line 28, "singal" should read --signal--.
Line 50, "VSIN-" should read --VSYN- --.

COLUMN 8

Line 65, "meories" should read --memories--.

COLUMN 9

Line 53, "decocer 4000" should read --decoder 4000--.

COLUMN 12

Line 23, "hand" should read --half--.
Line 28, "FIGS. A-L," should read --FIGS. 28A-28L,--.

COLUMN 16

Line 14, "unti 12" should read --unit 12--.

UNITED STATES PATENT AND TRADEMARK OFFICE
CERTIFICATE OF CORRECTION

PATENT NO. : 5,260,777

DATED : November 9, 1993

INVENTOR(S) : TAKAYUKI KOMINE, ET AL.

It is certified that error appears in the above-identified patent and that said Letters Patent is hereby corrected as shown below:

COLUMN 17

Line 13, "and" (first occurrence) should read --end--.
    Line 60, "FIG. 25," should read --FIGS. 25A-L,--.

COLUMN 18

Line 23, "circuit 4210" should read --circuit 4120--.

COLUMN 20

Line 51, "where" should read --wherein--.

Signed and Sealed this

Fourteenth Day of June, 1994

*Attest:*

BRUCE LEHMAN

*Attesting Officer*    *Commissioner of Patents and Trademarks*